United States Patent
Kitabayashi

(10) Patent No.: US 11,064,171 B1
(45) Date of Patent: Jul. 13, 2021

(54) METHOD OF CONTROLLING DISPLAY DEVICE, AND DISPLAY DEVICE

(71) Applicant: SEIKO EPSON CORPORATION, Tokyo (JP)

(72) Inventor: Kazuyoshi Kitabayashi, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/132,035

(22) Filed: Dec. 23, 2020

(30) Foreign Application Priority Data

Dec. 25, 2019 (JP) .............................. JP2019-234454

(51) Int. Cl.
*H04N 9/31* (2006.01)
*H04N 5/265* (2006.01)

(52) U.S. Cl.
CPC ........... *H04N 9/3179* (2013.01); *H04N 5/265* (2013.01); *H04N 9/312* (2013.01); *H04N 9/3105* (2013.01)

(58) Field of Classification Search
CPC .... H04N 5/265; H04N 9/3179; H04N 9/3105; H04N 9/31; H04N 9/312; H04N 9/3135; H04N 9/75; H04N 9/77; H04N 9/74; H04N 9/76; G09G 2340/12; G09G 2340/10; G09G 5/026; G09G 5/377
USPC ................ 348/590–600, 659, 661, 739, 744, 348/805–808, 569, 584–586; 345/204, 345/690, 22, 10, 659, 661, 629, 630, 634; 382/283, 284
See application file for complete search history.

(56) References Cited

U.S. PATENT DOCUMENTS

| 2014/0043504 | A1  | 2/2014  | Ito et al.   |            |
|--------------|-----|---------|--------------|------------|
| 2017/0296033 | A1* | 10/2017 | Takahashi    | A61B 1/0638 |
| 2019/0043444 | A1  | 2/2019  | Yasuda et al.|            |

FOREIGN PATENT DOCUMENTS

| JP | H06-339150 A  | 12/1994 |
| JP | 2008-061160 A | 3/2008  |
| JP | 2010-074394 A | 4/2010  |
| JP | 2013-073324 A | 4/2013  |
| JP | 2016-103841 A | 6/2016  |
| JP | 2019-032395 A | 2/2019  |

OTHER PUBLICATIONS

Adobe Photoshop, "Levels adjustment", The Wayback Machine— https://web./archive.org/web/20190517061014/https://helpx.adobe. com/photoshop/using/levels-adjustment.html (Copyright 2019).

* cited by examiner

*Primary Examiner* — Sherrie Hsia
(74) *Attorney, Agent, or Firm* — Oliff PLC

(57) ABSTRACT

A method of controlling a projector includes a distributing step of distributing each of luminance values of a plurality of pixels constituting an original image into a first luminance value, a second luminance value lower than the first luminance value, a third luminance value lower than the second luminance value, a first replacing step of replacing the luminance values of the pixels corresponding to the second luminance value with the third luminance value in the original image to generate a first image, a second replacing step of replacing the luminance values of the pixels corresponding to the second luminance value with the first luminance value in the original image to generate a second image, and a generating step of converting the luminance values of the pixels into transmittances in each of the first image and the second image to generate mask images.

7 Claims, 12 Drawing Sheets

FIG. 3
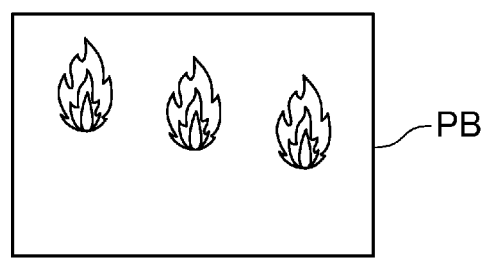
PB
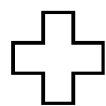
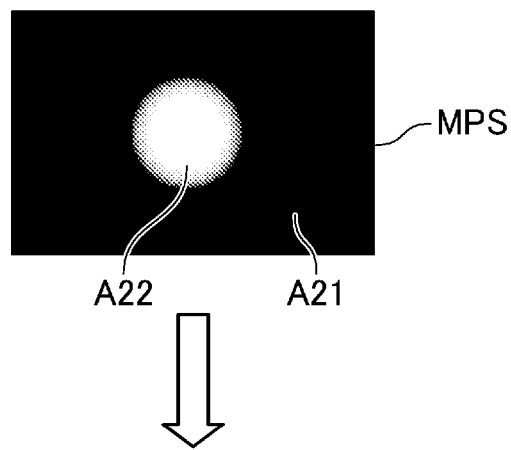
MPS
A22  A21
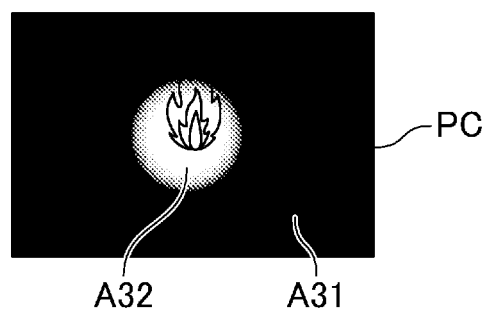
PC
A32  A31

METHOD OF CONTROLLING DISPLAY DEVICE, AND DISPLAY DEVICE

The present application is based on, and claims priority from JP Application Serial Number 2019-234454, filed Dec. 25, 2019, the disclosure of which is hereby incorporated by reference herein in its entirety.

BACKGROUND

1. Technical Field

The present disclosure relates to a method of controlling a display device and a display device.

2. Related Art

There has been known a display device, which combines a composite target image and a mask image with each other to generate a composite image, and then displays the composite image thus generated (see, e.g., JP-A-2019-32395 (Document 1)).

The projector described in Document 1 has an image processing section for combining a first image based on first image information and a second image generated by converting luminance information of second image information having the luminance information into transmittance with each other based on the transmittance to thereby generate a third image, and an image forming section for displaying the third image.

In the display device described in Document 1, when the luminance values of the pixels constituting an original image of the mask image include an intermediate gray level, the luminance value of the intermediate gray level is converted into the transmittance of the intermediate gray level, and therefore, there is a possibility that the mask image desired by the user fails to be generated.

SUMMARY

An aspect for solving the problem described above is directed to a method of controlling a display device including a distributing step of distributing each of luminance values of a plurality of pixels constituting an original image into a first luminance value, a second luminance value lower than the first luminance value, and a third luminance value lower than the second luminance value, a first replacing step of replacing the luminance values of the pixels corresponding to the second luminance value with the third luminance value in the original image to generate a first image, a second replacing step of replacing the luminance values of the pixels corresponding to the second luminance value with the first luminance value in the original image to generate a second image, and a generating step of converting the luminance values of the pixels into transmittances in each of the first image and the second image to generate mask images.

The method of controlling a display device described above may further include a third replacing step of replacing the luminance values of the pixels corresponding to the second luminance value with the third luminance value, and replacing the luminance values of the pixels corresponding to the third luminance value with the second luminance value in the original image to generate a third image, and a fourth replacing step of replacing the luminance values of the pixels corresponding to the second luminance value with the first luminance value, and replacing the luminance values of the pixels corresponding to the first luminance value with the second luminance value in the original image to generate a fourth image, wherein in the generating step, the luminance values of the pixels may be converted into transmittances in each of the third image and the fourth image to generate mask images.

The method of controlling a display device described above may further include a fifth replacing step of replacing the luminance values of the pixels corresponding to the third luminance value with the first luminance value, and replacing the luminance values of the pixels corresponding to the first luminance value with the third luminance value in the first image to generate a fifth image, and a sixth replacing step of replacing the luminance values of the pixels corresponding to the third luminance value with the first luminance value, and replacing the luminance values of the pixels corresponding to the first luminance value with the third luminance value in the second image to generate a sixth image, wherein in the generating step, the luminance values of the pixels may be converted into transmittances in each of the fifth image and the sixth image to generate mask images.

The method of controlling a display device described above may further include a seventh replacing step of replacing the luminance values of the pixels corresponding to the third luminance value with the first luminance value, and replacing the luminance values of the pixels corresponding to the first luminance value with the third luminance value in the third image to generate a seventh image, and an eighth replacing step of replacing the luminance values of the pixels corresponding to the third luminance value with the first luminance value, and replacing the luminance values of the pixels corresponding to the first luminance value with the third luminance value in the fourth image to generate an eighth image, wherein in the generating step, the luminance values of the pixels may be converted into transmittances in each of the seventh image and the eighth image to generate mask images.

In the method of controlling a display device described above, the first luminance value may represent a maximum luminance value, and the third luminance value may represent a minimum luminance value.

In the method of controlling a display device described above, there may further be included a determining step of determining whether or not the luminance values of the pixels constituting an outer edge of the original image are the second luminance value, wherein when it was determined in the determining step that the luminance values of the pixels constituting the outer edge of the original image were not the second luminance value, the luminance values of the pixels may be converted, in the generating step, into the transmittances in the original image to generate the mask image.

Another aspect for solving the problem described above is directed to a display device including a distribution section configured to distribute each of luminance values of a plurality of pixels constituting an original image into a first luminance value, a second luminance value lower than the first luminance value, and a third luminance value lower than the second luminance value, a first replacement section configured to replace the luminance values of the pixels corresponding to the second luminance value with the third luminance value in the original image to generate a first image, a second replacement section configured to replace the luminance values of the pixels corresponding to the second luminance value with the first luminance value in the original image to generate a second image, and a generation section configured to convert the luminance values of the pixels into transmittances in each of the first image and the second image to generate mask images.

BRIEF DESCRIPTION OF THE DRAWINGS

FIG. 3 is a diagram showing an example of processing of the projector combining images with each other.

DESCRIPTION OF EXEMPLARY EMBODIMENTS

An embodiment will hereinafter be described with reference to the drawings.

1. Configuration of Projector 1-1. Overall Configuration of Projector

Figure 1:
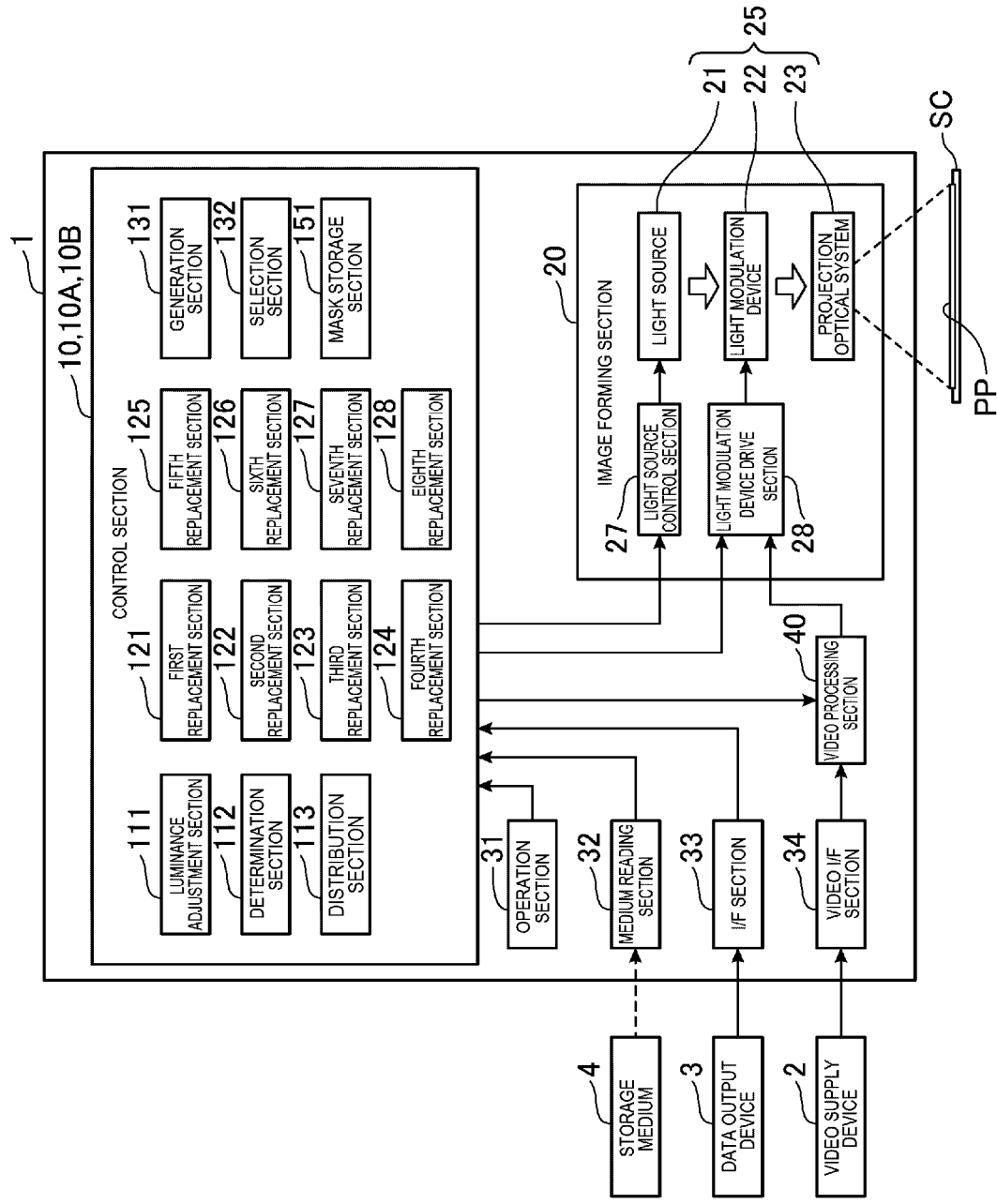
FIG. 1 is a diagram showing an example of a configuration of a projector.

FIG. 1 is a diagram showing an example of a configuration of a projector 1.

The projector 1 is a display device which projects image light to a screen SC to thereby display a projection image PP on the screen SC by means of projection. It is also possible for the projector 1 to project either of a still image and a video picture, namely a moving image, as the projection image PP, and in the following description, there is used the description of "video" or "image." Since the projector 1 updates the projection image PP at a preset frame rate with an image forming section 20 even when projecting a still image, there is no difference in the actual action between a still image and a video picture.

The screen SC can be a curtain-like screen to be installed on a wall surface, a ceiling surface, or a floor surface in a room of a building, but it is possible to use the wall surface as the screen SC. Further, it is also possible to utilize a plane of an installation such as a whiteboard or furniture as the screen SC. Further, the screen SC is not limited to a plane, but can also be a curved surface or a surface having asperity.

The projector 1 can use video data stored in a memory 10B described later as a video source of the projection image PP. Further, the video source of the projector 1 can be selected from a video signal input to the projector 1 from the video supply device 2, video data input to the projector 1 from a data output device 3, video data stored in a storage medium 4, and so on.

The video supply device 2 is coupled to the projector 1 via a cable or a wireless communication line, and outputs an analog video signal or a digital video signal to the projector 1. Here, the analog video signal is, for example, an analog video signal transmitted via a D-Sub connector or a D-terminal, or a composite video signal. The digital video signal is, for example, a signal transmitted via a variety of digital interfaces.

Specifically, there can be cited signals transmitted in compliance with HDMI (registered trademark), DVI, DisplayPort (registered trademark). Further, it is possible to adopt a configuration in which the digital video signal is input to the projector 1 from the video supply device 2 via a wireless interface such as Miracast (registered trademark) or WirelessHD (registered trademark).

In the following description, the analog video signal and the digital video signal are collectively referred to as a video signal. The video supply device 2 is formed of, for example, a video reproduction device such as a DVD (Digital Versatile Disc) player, a broadcast reception device such as a digital television tuner, a video game machine, or a personal computer. Further, the video supply device 2 can be formed of a communication device or the like for communicating with a personal computer and so on to receive the video data.

The data output device 3 is a device for outputting digital data of a video picture to the projector 1, and outputs a file encoded in, for example, the MPEG format to the projector 1. It is sufficient for the data output device 3 to be a device capable of inputting/outputting the digital data of the video picture in the form of a file, and the data output device 3 is specifically formed of a personal computer, a DVD player, an HDD (Hard Disk Drive) recorder, or the like.

The storage medium 4 is formed of a semiconductor storage device, a magnetic storage device, an optical storage medium, or the like, and stores data in a nonvolatile manner. For example, the storage medium 4 can also be an optical storage medium such as DVD, a memory device such as a USB memory, or a card-type storage medium such as an SD (registered trademark) card.

The projector 1 is provided with a control section 10, an image forming section 20, an operation section 31, a medium reading section 32, an I/F section 33, a video I/F section 34, and a video processing section 40.

The control section 10 is provided with a processor 10A such as a CPU (Central Processing Unit), and is provided with a memory 10B such as a ROM (Read Only Memory) for storing a control program and so on to be executed by the processor 10A in a nonvolatile manner and a RAM (Random Access Memory) forming a work area to be used by the processor 10A. In the control section 10, the processor 10A executes the control program stored by the memory 10B to thereby control each section of the projector 1 to execute a variety of operations related to the projection of the projection image PP. It should be noted that the control section 10 can also be provided with a plurality of processors.

The memory 10B is provided with a semiconductor storage device and a magnetic storage device to store the control program to be executed by the processor of the control section 10 and the data to be processed by the processor 10A in a nonvolatile manner. The memory 10B stores configuration data and video data. The configuration data includes information to be set in relation to an operation of the projector 1.

The video data is the video data available as the video source of the projection image PP, and is, for example, data in the form of a file similarly to the video data to be input to the projector 1 from the data output device 3. The video data can also be the data which is the video data to be input to the projector 1 from the data output device 3, and is obtained by the control section 10, and is then stored in the memory 10B.

The operation section 31 receives an input operation by the user related to the function of the projector 1. The operation section 31 is formed of, for example, an operation panel provided to a main body of the projector 1, detects an operation to a variety of switches disposed in the operation panel, and then outputs an operation signal to the control section 10.

Further, the operation section 31 can also be a configuration provided with a light receiving section for receiving an infrared signal transmitted by a remote control device of the projector 1. In this case, the operation section 31 decodes the infrared signal received from the remote control device, and then outputs the operation signal corresponding to the operation of the remote control device to the control section 10.

The medium reading section 32 is an interface circuit for retrieving the data stored in the storage medium 4. The medium reading section 32 can be a configuration capable of writing the data to and erasing the data from the storage medium 4. The medium reading section 32 retrieves the video data stored in the storage medium 4 as the video source, and then outputs the video data to the control section 10 in accordance with the control by the control section 10.

The medium reading section 32 can be provided with, for example, a USB (Universal Serial Bus) connector to be coupled to the storage medium 4 as the USB memory, a card slot to which the card-type storage medium. 4 is mounted, and a drive for reproducing an optical recording medium such as a DVD.

The I/F section 33 is an interface circuit to be coupled to the data output device 3, and is configured using, for example, a known data communication interface. Specifically, the I/F section 33 can be a USB interface, a LAN (Local Area Network; including Ethernet (registered trademark)) interface, an IEEE 1394 interface, or the like which can be coupled to the data output device 3 with a communication cable.

Further, the I/F section 33 can also be a wireless communication interface circuit using a wireless communication line. Specifically, the I/F section 33 can be configured including a communication interface for performing communication in compliance with wireless LAN including Wi-Fi (registered trademark), Bluetooth (registered trademark), ZigBee (registered trademark), or the like.

The I/F section 33 can be provided with an interface circuit for executing, when being coupled to the data output device 3, a function of detecting the coupling of the data output device 3, a function of establishing communication with the data output device 3, a power supply function to the data output device 3, and so on.

The control section 10 is capable of performing the data communication with the data output device 3 using the I/F section 33 to obtain the video data output by the data output device 3.

The video I/F section 34 is an interface circuit to be coupled to the video supply device 2, and is configured using, for example, a known video input interface circuit. Specifically, the video I/F section 34 is provided with the D-sub connector, the D-terminal, the composite video terminal, and the interface circuit compliant with HDMI, DVI, DisplayPort, or the like described above. Further, the video I/F section 34 can be a wireless interface circuit compliant with Miracast, WirelessHD, or the like.

The video I/F section 34 outputs the video signal input from the video supply device 2 to the video processing section 40. Further, it is possible for the video I/F section 34 to execute the data communication with the video supply device 2 to perform acquisition of information related to discrimination of the model of the video supply device 2 and the name of the vender, the video signal input from the video supply device 2, and so on in accordance with the control by the control section 10.

The image forming section 20 for forming the projection image PP is provided with a projection section 25, alight source control section 27, and a light modulation device drive section 28, and the projection section 25 includes alight source 21, a light modulation device 22, and the projection optical system 23.

The light source 21 is formed of a lamp such as a xenon lamp or a super-high pressure mercury lamp, or a solid-state light source such as an LED or a laser source. The light source 21 is put on by the electrical power supplied from the light source control section 27, and emits light toward the light modulation device 22. The light source control section 27 can control the emission luminance of the light source 21 in accordance with the control by the control section 10.

The light modulation device 22 modulates the light emitted by the light source 21 to generate the image light, and then irradiates the projection optical system 23 with the image light. In the present embodiment, there is illustrated a configuration in which the light modulation device 22 is provided with three liquid crystal panels corresponding respectively to the colors of red (R), green (G), and blue (B), and makes the liquid crystal panels transmit the light emitted by the light source 21.

To the three liquid crystal panels of the light modulation device 22, there is coupled the light modulation device drive section 28. The light modulation device drive section 28 drives each of the pixels of the liquid crystal panels based on the video signal output by the video processing section 40 to draw an image on the liquid crystal panels frame by frame (screen by screen).

It is also possible to provide a reflector, a lens group, a polarization plate, a dimming element, and so on to the light path between the light source 21 and the light modulation device 22, or to the light modulation device 22. Further, the light modulation device 22 can be provided with a configuration using reflective liquid crystal panels. In this case, the light modulation device 22 makes the liquid crystal panels reflect the light emitted by the light source 21 to guide the reflected light to the projection optical system 23. Further, it is also possible to provide the light modulation device 22 with a configuration using digital mirror devices (DMD), or with a configuration provided with a single DMD and a color wheel. Further, the light modulation device 22 can have a configuration provided with reflective liquid crystal panels.

The projection optical system 23 projects the image light having been modulated by the light modulation device 22 toward the screen SC to form the projection image PP on the screen SC. The projection optical system 23 can be provided with a configuration having optical elements such as a prism for combining light beams having passed through the respective three liquid crystal panels, a lens group or a mirror for guiding the image light. Further, it is also possible for the projection optical system 23 to be provided with a zoom mechanism or a mechanism for a focus adjustment.

The video processing section 40 generates the video signal from the video source to output the result to the light modulation device drive section 28 in accordance with the control by the control section 10.

When the video source selected by the control section 10 is the video signal input to the video I/F section 34, the video signal is input to the video processing section 40 from the video I/F section 34. Further, when the video source selected by the control section 10 is the video data stored in the storage medium 4 or the storage section 11, or the video data input from the data output device 3, the video data is input to the video processing section 40 from the control section 10.

The control section 10 executes the control program stored by the memory 10B, selects the video source of the projector 1 in accordance with the operation by the user received by the operation section 31, and then projects the video picture based on the video source thus selected with the image forming section 20 to thereby display the video picture on the screen SC.

When the control section 10 has selected the video supply device 2 as the video source, the control section 10 controls the video I/F section 34 and the video processing section 40 to execute the processing of the video signal input to the video I/F section 34 from the video supply device 2. Thus, the video signal is output from the video processing section 40 to the light modulation device drive section 28, and the video picture corresponding to the video signal is projected by the image forming section 20.

Further, when the control section 10 has selected the video data output by the data output device 3 as the video source, the control section 10 obtains the video data, and then outputs the video data to the video processing section 40. When the control section 10 has selected the video data stored in the storage medium 4 or the video data stored in the storage section 11 as the video source, the control section 10 performs reading of the video data, and then outputs the video data to the video processing section 40. In these cases, the control section 10 controls the video processing section 40 to process the video data to make the image forming section 20 project the video picture based on the video data.

Further, the control section 10 retrieves mask images MP to be combined with the video source from a mask storage section 151 described later, and then outputs the mask images MP to the video processing section 40. The mask image MP represents an image in which the transmittance T is set for each of the pixels. The mask image MP can be reworded as a filter image for executing a filter process.

1-2. Configuration of Control Section

The control section 10 is provided with a luminance adjustment section 111, a determination section 112, a distribution section 113, a first replacement section 121, a second replacement section 122, a third replacement section 123, a fourth replacement section 124, a fifth replacement section 125, a sixth replacement section 126, a seventh replacement section 127, an eighth replacement section 128, a generation section 131, a selection section 132, and the mask storage section 151. Specifically, the processor 10A of the control section 10 executes the control program stored by the memory 10B to thereby function as the luminance adjustment section 111, the determination section 112, the distribution section 113, the first replacement section 121, the second replacement section 122, the third replacement section 123, the fourth replacement section 124, the fifth replacement section 125, the sixth replacement section 126, the seventh replacement section 127, the eighth replacement section 128, the generation section 131, and the selection section 132. Further, the processor 10A of the control section 10 executes the control program stored by the memory 10B to thereby make the memory 10B function as the mask storage section 151.

The mask storage section 151 stores the mask images MP generated by the generation section 131. The mask images MP stored in the mask storage section 151 are retrieved by the selection section 132.

The luminance adjustment section 111 adjusts the luminance values BA of the pixels of the original image PA so that a first luminance value BA1 of the pixel of the original image PA becomes a maximum luminance value BX, and a third luminance value BA3 of the pixel of the original image PA becomes a minimum luminance value BN.

The first luminance value BA1 represents the highest one of the luminance values BA of the pixels constituting the original image PA. The third luminance value BA3 represents the lowest one of the luminance values BA of the pixels constituting the original image PA.

In other words, the luminance adjustment section 111 adjusts the range of the luminance values BA from the range from the first luminance value BA1 to the third luminance value BA3 into the range from the minimum luminance value BN to the maximum luminance value BX. When the luminance value BA is represented at 256 gray levels, the luminance value BA shows "255" in the maximum luminance value BX, and the luminance value BA shows "0" in the minimum luminance value BN.

The luminance adjustment section 111 adjusts the luminance values BA of the pixels of the original image PA with, for example, the formula (1) described below to calculate the luminance values B having been adjusted.

$$B=(BX-BN)\times BA/(BA1-BA3)+\alpha \quad (1)$$

It should be noted that the coefficient α is expressed as the formula (2) described below.

$$\alpha=(BN\times BA1-BX\times BA3)/(BA1-BA3) \quad (2)$$

The determination section 112 determines whether or not the luminance value B of the pixel constituting an outer edge of the original image PA is a second luminance value B2 in the original image PA in which the luminance value BA is adjusted into the luminance value B by the luminance adjustment section 111.

It should be noted that in the following description, the original image PA in which the luminance value BA is adjusted into the luminance value B by the luminance adjustment section 111 is simply described as the original image PA in some cases.

The second luminance value B2 is the luminance value B lower than the first luminance value B1, and is, at the same time, the luminance value B higher than the third luminance value B3. The first luminance value B1 represents the highest one of the luminance values B of the pixels constituting the original image PA. The first luminance value B1 is the maximum luminance value BX. The third luminance value B3 represents the lowest one of the luminance values B of the pixels constituting the original image PA. The third luminance value B3 is the minimum luminance value BN.

The processing of the determination section 112 will be described later in detail with reference to FIG. 4.

The distribution section 113 distributes the luminance values B of the respective pixels of the original image PA into the first luminance value B1, the second luminance value B2, and the third luminance value B3 in the original image PA in which the luminance values BA are adjusted by the luminance adjustment section 111 into the luminance values B. The second luminance value B2 is lower than the first luminance value B1, and the third luminance value B3 is lower than the second luminance value B2.

The first luminance value B1 is the maximum luminance value BX, the third luminance value B3 is the minimum luminance value BN, and the second luminance value B2 represents the luminance value B at an intermediate gray level. When the luminance value B is represented by the 256 gray levels, the luminance value B at the intermediate gray level is no lower than 1 and no higher than 254.

The first replacement section 121 replaces the luminance values B of the pixels corresponding to the second luminance value B2 with the third luminance value B3 in the original image PA to generate a first image P1. The pixel corresponding to the second luminance value B2 in the original image PA represents the pixel the luminance value B of which is the second luminance value B2 in the original image PA.

In other words, the first replacement section 121 replaces the second luminance value B2 as the luminance value B with the third luminance value B3 with respect to the pixels the luminance values B of which are the second luminance value B2 in the original image PA, to thereby generate the first image P1.

The processing of the first replacement section 121 will be described later in detail with reference to FIG. 5.

The second replacement section 122 replaces the luminance values B of the pixels corresponding to the second luminance value B2 with the first luminance value B1 in the original image PA to generate a second image P2.

In other words, the second replacement section 122 replaces the second luminance value B2 as the luminance value B with the first luminance value B1 with respect to the pixels the luminance values B of which are the second luminance value B2 in the original image PA, to thereby generate the second image P2.

The processing of the second replacement section 122 will be described later in detail with reference to FIG. 5.

The third replacement section 123 replaces the luminance values B of the pixels corresponding to the second luminance value B2 with the third luminance value B3, and at the same time, replaces the luminance values B of the pixels corresponding to the third luminance value B3 with the second luminance value B2 in the original image PA to generate a third image P3. The pixel corresponding to the third luminance value B3 in the original image PA represents the pixel the luminance value B of which is the third luminance value B3 in the original image PA.

In other words, the third replacement section 123 replaces the second luminance value B2 as the luminance value B with the third luminance value B3 with respect to the pixels the luminance values B of which are the second luminance value B2 in the original image PA, and at the same time, replaces the third luminance value as the luminance value B with the second luminance value B2 with respect to the pixels the luminance values B of which are the third luminance value B3 in the original image PA to thereby generate the third image P3.

The processing of the third replacement section 123 will be described later in detail with reference to FIG. 6.

The fourth replacement section 124 replaces the luminance values B of the pixels corresponding to the second luminance value B2 with the first luminance value B1, and at the same time, replaces the luminance values B of the pixels corresponding to the first luminance value B1 with the second luminance value B2 in the original image PA to generate a fourth image P4. The pixel corresponding to the first luminance value B1 represents the pixel the luminance value B of which is the first luminance value B1 in the original image PA.

In other words, the fourth replacement section 124 replaces the second luminance value B2 as the luminance value B with the first luminance value B1 with respect to the pixels the luminance values B of which are the second luminance value B2 in the original image PA, and at the same time, replaces the first luminance value B1 as the luminance value B with the second luminance value B2 with respect to the pixels the luminance values B of which are the first luminance value B1 in the original image PA to thereby generate the fourth image P4.

The processing of the fourth replacement section 124 will be described later in detail with reference to FIG. 6.

The fifth replacement section 125 replaces the luminance values B of the pixels corresponding to the third luminance value B3 with the first luminance value B1, and at the same time, replaces the luminance values B of the pixels corresponding to the first luminance value B1 with the third luminance value B3 in the first image P1 to generate a fifth image P5. The pixel corresponding to the third luminance value B3 in the first image P1 represents the pixel the luminance value B of which is the third luminance value B3 in the first image P1. Further, the pixel corresponding to the first luminance value B1 in the first image P1 represents the pixel the luminance value B of which is the first luminance value B1 in the first image P1.

In other words, the fifth replacement section 125 replaces the third luminance value B3 as the luminance value B with the first luminance value B1 with respect to the pixels the luminance values B of which are the third luminance value B3 in the first image P1, and at the same time, replaces the first luminance value B1 as the luminance value B with the third luminance value B3 with respect to the pixels the luminance values B of which are the first luminance value B1 in the first image P1 to thereby generate the fifth image P5.

The processing of the fifth replacement section 125 will be described later in detail with reference to FIG. 7.

The sixth replacement section 126 replaces the luminance values B of the pixels corresponding to the third luminance value B3 with the first luminance value B1, and at the same time, replaces the luminance values B of the pixels corresponding to the first luminance value B1 with the third luminance value B3 in the second image P2 to generate a sixth image P6. The pixel corresponding to the third luminance value B3 in the second image P2 represents the pixel the luminance value B of which is the third luminance value B3 in the second image P2. Further, the pixel corresponding to the first luminance value B1 in the second image P2 represents the pixel the luminance value B of which is the first luminance value B1 in the second image P2.

In other words, the sixth replacement section 126 replaces the third luminance value B3 as the luminance value B with the first luminance value B1 with respect to the pixels the luminance values B of which are the third luminance value B3 in the second image P2, and at the same time, replaces the first luminance value B1 as the luminance value B with the third luminance value B3 with respect to the pixels the luminance values B of which are the first luminance value B1 in the second image P2 to thereby generate the sixth image P6.

The processing of the sixth replacement section 126 will be described later in detail with reference to FIG. 7.

The seventh replacement section 127 replaces the luminance values B of the pixels corresponding to the third luminance value B3 with the first luminance value B1, and at the same time, replaces the luminance values B of the pixels corresponding to the first luminance value B1 with the third luminance value B3 in the third image P3 to generate a seventh image P7. The pixel corresponding to the third luminance value B3 in the third image P3 represents the pixel the luminance value B of which is the third luminance value B3 in the third image P3. Further, the pixel corresponding to the first luminance value B1 in the third image P3 represents the pixel the luminance value B of which is the first luminance value B1 in the third image P3.

In other words, the seventh replacement section 127 replaces the third luminance value B3 as the luminance value B with the first luminance value B1 with respect to the pixels the luminance values B of which are the third luminance value B3 in the third image P3, and at the same time, replaces the first luminance value B1 as the luminance value B with the third luminance value B3 with respect to the pixels the luminance values B of which are the first luminance value B1 in the third image P3 to thereby generate the seventh image P7.

The processing of the seventh replacement section 127 will be described later in detail with reference to FIG. 8.

The eighth replacement section 128 replaces the luminance values B of the pixels corresponding to the third luminance value B3 with the first luminance value B1, and at the same time, replaces the luminance values B of the pixels corresponding to the first luminance value B1 with the third luminance value B3 in the fourth image P4 to generate an eighth image P8. The pixel corresponding to the third luminance value B3 in the fourth image P4 represents the pixel the luminance value B of which is the third luminance value B3 in the fourth image P4. Further, the pixel corresponding to the first luminance value B1 in the fourth image P4 represents the pixel the luminance value B of which is the first luminance value B1 in the fourth image P4.

In other words, the eighth replacement section 128 replaces the third luminance value B3 as the luminance value B with the first luminance value B1 with respect to the pixels the luminance values B of which are the third luminance value B3 in the fourth image P4, and at the same time, replaces the first luminance value B1 as the luminance value B with the third luminance value B3 with respect to the pixels the luminance values B of which are the first luminance value B1 in the fourth image P4 to thereby generate the eighth image P8.

The processing of the eighth replacement section 128 will be described later in detail with reference to FIG. 8.

When the determination section 112 has determined that the luminance value B of each of the pixels constituting the outer edge of the original image PA is not the second luminance value B2, the generation section 131 converts the luminance value B of each of the pixels into the transmittance T in the original image PA to generate the mask image MPA.

Further, when the determination section 112 has determined that the luminance value B of each of the pixels constituting the outer edge of the original image PA is the second luminance value B2, the generation section 131 converts the luminance value B of each of the pixels into the transmittance T in each of the first image P1 and the second image P2 to generate the mask image MPA. Specifically, the generation section 131 converts the luminance value B of each of the pixels of the first image P1 into the transmittance T to generate a first mask image MP1. Further, the generation section 131 converts the luminance value B of each of the pixels of the second image P2 into the transmittance T to generate a second mask image MP2.

Further, the generation section 131 converts the luminance value B of each of the pixels into the transmittance T in each of the third image P3 and the fourth image P4 to generate the mask image MP. Specifically, the generation section 131 converts the luminance value B of each of the pixels of the third image P3 into the transmittance T to generate a third mask image MP3. Further, the generation section 131 converts the luminance value B of each of the pixels of the fourth image P4 into the transmittance T to generate a fourth mask image MP4.

Further, the generation section 131 converts the luminance value B of each of the pixels into the transmittance T in each of the fifth image P5, the sixth image P6, the seventh image P7, and the eighth image P8 to generate the mask images MP. Specifically, the generation section 131 converts the luminance value B of each of the pixels of the fifth image P5 into the transmittance T to generate a fifth mask image MP5. Further, the generation section 131 converts the luminance value B of each of the pixels of the sixth image P6 into the transmittance T to generate a sixth mask image MP6. Further, the generation section 131 converts the luminance value B of each of the pixels of the seventh image P7 into the transmittance T to generate a seventh mask image MP7. Further, the generation section 131 converts the luminance value B of each of the pixels of the eighth image P8 into the transmittance T to generate an eighth mask image MP8.

Further, the generation section 131 records the mask image MPA and the first mask image MP1 through the eighth mask image MP8 thus generated on the mask storage section 151.

It should be noted that as a method of converting the luminance value B into the transmittance T, there can be cited the two methods described below. In the first method, the luminance value B is converted into the transmittance T so that the higher the luminance value B is, the higher the transmittance T is. In the second method, the luminance value B is converted into the transmittance T so that the higher the luminance value B is, the lower the transmittance T is. In the present embodiment, there is described when converting the luminance value B into the transmittance T using the first method.

The selection section 132 selects a mask image MPS from the first mask image MP1 through the eighth mask image MP8 based on the operation from the user. The mask image MPS thus selected is combined with the input image PB by the video processing section 40, and thus a composite image PC is generated, and the composite image PC is projected to the screen SC.

The video processing section 40 will be described later in detail with reference to FIG. 2.

Although in the present embodiment, the generation section 131 generates the first mask image MP1 through the eighth mask image MP8, the embodiment of the present disclosure is not limited thereto. It is sufficient for the generation section 131 to generate at least the first mask image MP1 and the second mask image MP2. It is also possible for the generation section 131 to generate, for example, the first mask image MP1 through the fourth mask image MP4.

Further, although in the present embodiment, the generation section 131 converts the luminance value B into the transmittance T so that the higher the luminance value B is, the higher the transmittance T is, the embodiment of the present disclosure is not limited thereto. It is sufficient for the generation section 131 to convert the luminance value B into the transmittance T. It is possible for the generation section 131 to convert the luminance value B into the transmittance T so that, for example, the higher the luminance value B is, the lower the transmittance T is.

1-3. Configuration of Video Processing Section

Figure 2:
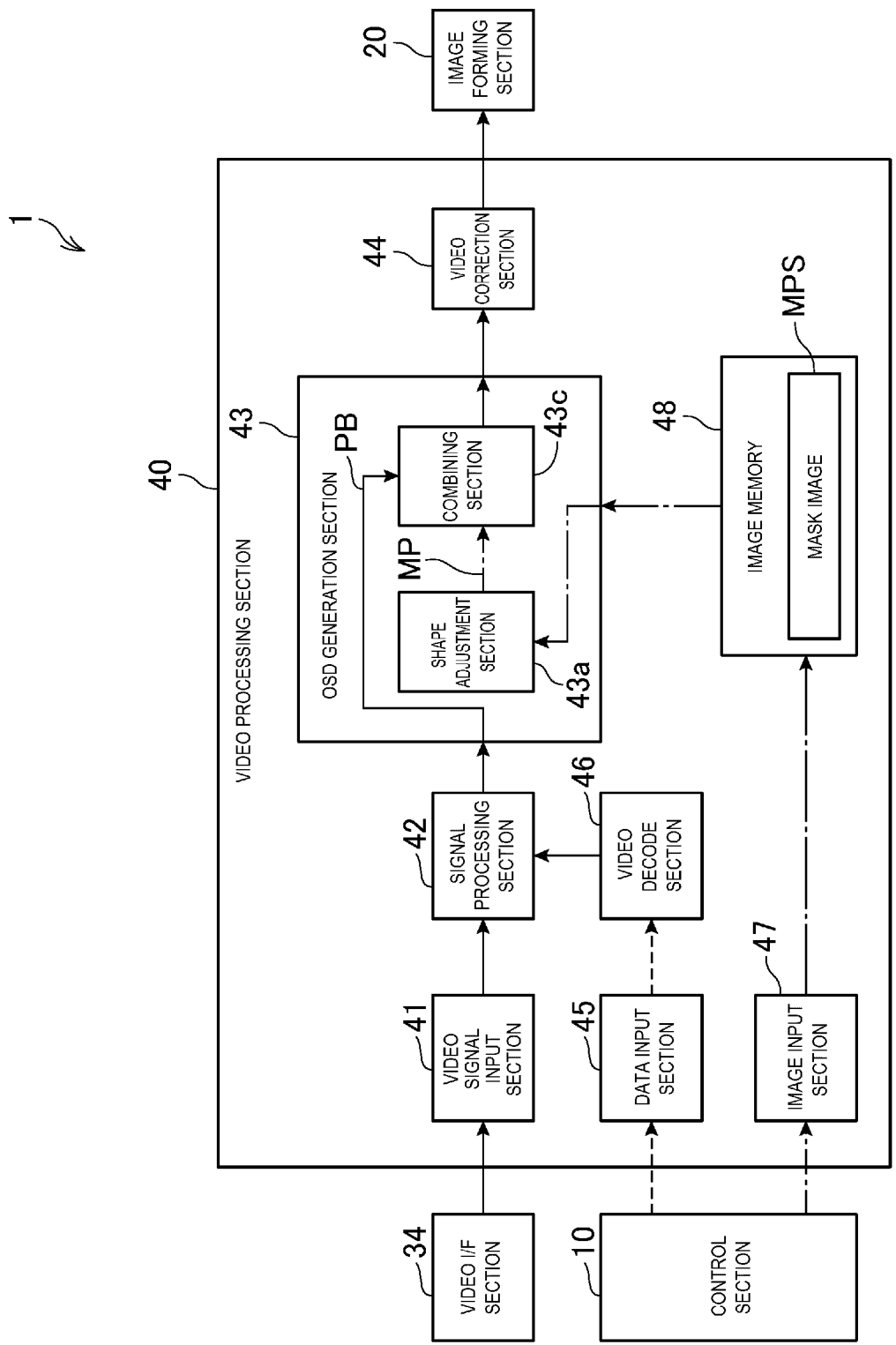
FIG. 2 is a diagram showing an example of a configuration of an image processing section.

FIG. 2 is a diagram showing an example of a configuration of the video processing section 40. The solid arrows in FIG. 2 represent the flow of the video signal, the dotted arrows represent the flow of the video data, and the dashed-dotted arrows represent the flow of mask image data described later. Further, the input image PB, the mask image MPS, and the composite image PC shown in FIG. 2 will further be described with reference to FIG. 3. The mask image data represents the mask image MPS.

As shown in FIG. 2, the video processing section 40 is provided with a video signal input section 41, a signal processing section 42, an OSD generation section 43, a video correction section 44, a data input section 45, a video decode section 46, an image input section 47, and an image memory 48.

The video processing section 40 can be the circuits provided with hardware corresponding to the functional sections shown in FIG. 2, or can also be an IC (Integrated Circuit) having these circuits integrated or a programmable device such as an FPGA (Field-Programmable Gate Array). Further, the video processing section 40 can be provided with a configuration which is provided with a processor for executing a program, and in which the processor executes the program to realize the functional sections shown in FIG. 2 due to the cooperation between the software and the hardware.

The processing sections, namely the video signal input section 41, the signal processing section 42, the OSD generation section 43, and the video correction section 44 provided to the video processing section 40 can be coupled to a frame memory. In this case, the sections of the video processing section 40 develop the image constituting one frame of the video picture in the frame memory based on the video signal, and then execute the variety of types of processing.

The frame memory can be one having a capacity enough for storing an image corresponding to a plurality of frames. Further, the frame memory can be configured, for example, using a part of the storage area of the RAM provided to the control section 10, or it is possible to couple a DRAM (Dynamic Random Access Memory) to the video processing section 40 via a memory bus or a DRAM controller not shown to make the DRAM function as the frame memory.

The video signal input section 41 executes processing such as conversion into a signal format suitable for the signal processing in the projector 1 with respect to the video signal input from the video I/F section 34, and then outputs the result to the signal processing section 42.

The signal processing section 42 executes a brightness conversion process of performing conversion into the state in which the brightness of the video picture is set and a color conversion process with respect to the video signal input from the video signal input section 41 in accordance with the control by the control section 10. Further, the signal processing section 42 can also execute a noise rejection process on the video signal. The signal processing section 42 outputs the video signal on which the processing has been executed to the OSD generation section 43.

The data input section 45 obtains the video data input from the control section 10, and then outputs the video data to the video decode section 46. The video data to be input to the data input section 45 is the video data which the control section 10 input to the video processing section 40 based on the video data in the form of a file. The video decode section 46 decodes the video data input from the data input section 45, then converts the result into a video signal suitable for the signal processing in the signal processing section 42, and then outputs the video signal thus converted to the signal processing section 42. To the video decode section 46, there is input, for example, a video stream generated from the video data in the form of a file. The processing for generating the video stream from the video data in the form of a file can be executed by the control section 10, or can also be executed by the data input section 45.

Further, the control section 10 outputs the mask image data to the video processing section 40. The mask image data is input to the image input section 47, and the image input section 47 writes the mask image MPS in the image memory 48 based on the mask image data. The mask image MPS corresponds to the mask image MP selected by the selection section 132 shown in FIG. 1.

The image memory 48 is a temporary storage area for temporarily storing the mask image MPS, and is formed of a volatile memory incorporated in the video processing section 40, a DRAM coupled to the video processing section 40, or the like. The image memory 48 can be a part of the frame memory described above, or can also be configured using a storage area of the same memory as the frame memory.

The OSD generation section 43 executes processing of combining images with each other. The OSD generation section 43 extracts an image corresponding to one frame from the video signal input from the signal processing section 42 to form a target image of the combining process, namely the input image PB. The OSD generation section 43 superimposes an OSD image on the input image PB. The OSD generation section 43 outputs the video signal of the composite image PC to the video correction section 44.

The video correction section 44 executes a variety of correction processes such as a geometric correction process in accordance with the control by the control section 10 with respect to a composite image PC output by the OSD generation section 43, and then outputs the result to the image forming section 20. As the correction processes to be executed by the video correction section 44, there can be cited, for example, a keystone distortion correction and a barrel distortion correction.

The OSD image is an image which forms, for example, a menu screen for setting the functions of the projector 1, and a message screen for announcing the operation state of the projector 1. The image data of the OSD image can be stored in the storage section 11 in advance, and it is possible for the control section 10 to retrieve the OSD image stored in the storage section 11 and then output the OSD image to the video processing section 40. Further, it is possible for the control section 10 to generate the data of the OSD image in accordance with the state of the input source or the error state of the projector 1, or the operation or the like of the operation section 31, and then output the data to the video processing section 40. The data of the OSD image is input to, for example, the image input section 47, and is then written to the image memory 48 by the image input section 47. The control section 10 controls the OSD generation section 43 to execute the processing of superimposing the OSD image.

The OSD generation section 43 superimposes the OSD image on each of the frames constituting the video picture input from the signal processing section 42. Here, it is possible for the OSD generation section 43 to superimpose the image on all of the frames of the video picture input, or superimpose the image on some of the frames.

Further, it is also possible for the OSD generation section 43 to superimpose the mask image MPS written in the image memory 48 on the frames of the video picture input from the signal processing section 42 in accordance with the control by the control section 10 to generate the composite image PC.

FIG. 3 is a diagram showing an example of the processing of the projector 1 combining images with each other. The processing of combining the images with each other is executed by the OSD generation section 43.

The input image PB is an example of an image generated based on the video signal input to the OSD generation section 43. The composite image PC is obtained by superimposing the mask image MPS on the input image PB.

The input image PB, the mask image MPS, and the composite image PC are each an image having a plurality of pixels. The input image PB is, for example, an RGB 24-bit full-color image, and the data of the input image PB includes grayscale data of R, G, and B for each of the pixels.

The mask image MPS includes a plurality of areas having respective transmittances T different from each other. One area can be constituted by a single pixel, or can also be constituted by a plurality of pixels. The positions, the sizes, the shapes of the areas are arbitrary. The data of the mask image MPS includes the transmittances T in the respective areas. The transmittance T means the extent to which the input image PB is seen through the mask image MPS when the mask image MPS is superimposed as an upper layer of the input image PB, and can also be called transparency.

The mask image MPS shown in FIG. 3 includes an area A221 and an area A22 in which the respective transmittances T different from each other are set. The area A21 is an area in which the transmittance T is set to 0%. The area A22 is an area in which the transmittance T is set to 100%. The mask image MPS can be an image in which the transmittance T changes from 0% to 100% between the pixels located on the boundary between the area A21 and the area A22. Further, the mask image MPS can be an image forming gradations of the transmittance T gradually varying from 100% to 0% in the plurality of pixels located on the boundary portion between the area A21 and the area A22 as illustrated in FIG. 3. In this case, the transmittances T are set to the respective pixels located on the boundary between the area A21 and the area A22 so that the gradations are formed.

The mask image MPS is transparent in the area where the transmittance T is 100%, namely the area A22, and is colored in the area where the transmittance T is lower than 100%. The color is arbitrary, and can be set to, for example, black as shown in FIG. 3, or can also be other colors. Further, in one mask image MPS, it is possible to dispose a plurality of colors in the area where the transmittance T is lower than 100%.

In the present embodiment, there will be described when the mask image MPS is colored in black.

The composite image PC is an image obtained by superimposing the mask image MPS as an upper layer of the input image PB. An area A31 of the composite image PC is an area corresponding to the area A21 of the mask image MPS. Since the transmittance T in the area A21 is 0%, the area A31 of the composite image PC is constituted by pixels the same in color as the pixels in the area A21. In contrast, in the composite image PC, in the area where the transmittance T in the mask image MPS is 100%, the input image PB is transmitted. Therefore, in the area A32, apart of the input image PB appears transmitted through the area A22.

In the composite image PC shown in FIG. 3, a part of the input image PB is visually recognized with high brightness, another part is visually recognized with low brightness, and another part is in an invisible state, which has a visual effect as if putting a spotlight on the input image PB. This visual effect is called an illumination effect. It is possible for the projector 1 to project the input image PB to the screen SC providing the input image PB with the illumination effect by superimposing the mask image MPS in which the transmittance T is set on the input image PB.

Going back to FIG. 2, the configuration of the OSD generation section 43 will be described. As shown in FIG. 2, the OSD generation section 43 is provided with a shape adjustment section 43a and a combining section 43c. FIG. 2 is a functional block diagram, and it is possible for the OSD generation section 43 to be provided with hardware functioning as each of the shape adjustment section 43a and the combining section 43c. Alternatively, it is also possible to adopt a configuration in which the OSD generation section 43 executes the processing corresponding to the respective functions of the shape adjustment section 43a and the combining section 43c in the order shown in the drawing. In other words, the shape adjustment section 43a and the combining section 43c can be those schematically showing the functions and the processing to be executed by the OSD generation section 43. In other words, it is sufficient for the OSD generation section 43 to be what executes the shape adjustment process and the combining process in sequence.

The shape adjustment section 43a obtains the mask image MPS from the image memory 48, and then executes the processing of adjusting the shape and the size on the mask image MPS. In this processing, the shape and the size of the mask image MPS are made to fit the shape and the size or the resolution of the light modulation device 22. The video signal output by the signal processing section 42 to the OSD generation section 43 is adjusted in the shape, the size, and the resolution by the signal processing section 42. The shape adjustment section 43a makes the shape, the size, and the resolution of the mask image MPS fit the video signal input from the signal processing section 42. Specifically, the shape, the size, and the resolution of the mask image MPS are made to fit the shape, the size, and the resolution of the input image PB, respectively.

The combining section 43c combines the mask image MPS adjusted by the shape adjustment section 43a so as to be superimposed as the upper layer of the input image PB input from the signal processing section 42 to thereby generate the composite image PC, and then output the composite image PC to the video correction section 44. As described above, in the projector 1, the OSD generation section 43 provides the input image PB with the illumination effect using the mask image MPS.

In order to realize the general OSD display function, it is possible for the OSD generation section 43 to display the OSD image such as the menu screen described above so as to be superimposed on the input image PB. In this case, the control section 10 outputs the image data of the OSD image to the image input section 47, and the image input section 47 draws the OSD image in the image memory 48. When processing the OSD image such as the menu screen, the shape adjustment section 43a obtains the OSD image from the image memory 48, and then adjusts the size of the OSD image in accordance with the size and the resolution of the input image PB. The shape and the size of the OSD image are not required to coincide with those of the input image PB.

The video processing section 40 executes the signal processing on the video signal using the signal processing section 42, and executes the video processing for providing the illumination effect using the OSD generation section 43. As described above, since the video processing related to the input image PB is executed by a different processing section from the OSD generation section 43, namely the signal processing section 42, there is an advantage that the video signal can be processed without being affected by the illumination effect.

In the present embodiment, as described with reference to FIG. 1, the control section 10 is provided with the luminance adjustment section 111, the determination section 112, the distribution section 113, the first replacement section 121, the second replacement section 122, the third replacement section 123, the fourth replacement section 124, the fifth replacement section 125, the sixth replacement section 126, the seventh replacement section 127, the eighth replacement section 128, the generation section 131, the selection section 132, and the mask storage section 151, but the embodiment of the present disclosure is not limited thereto. It is sufficient for one of the control section 10 shown in FIG. 1 and the video processing section 40 to be provided with the luminance adjustment section 111, the determination section 112, the distribution section 113, the first replacement section 121, the second replacement section 122, the third replacement section 123, the fourth replacement section 124, the fifth replacement section 125, the sixth replacement section 126, the seventh replacement section 127, the eighth replacement section 128, the generation section 131, the selection section 132, and the mask storage section 151. For example, it is possible for the control section 40 to be provided with the luminance adjustment section 111, the determination section 112, the distribution section 113, the first replacement section 121, the second replacement section 122, the third replacement section 123, the fourth replacement section 124, the fifth replacement section 125, the sixth replacement section 126, the seventh replacement section 127, the eighth replacement section 128, the generation section 131, the selection section 132, and the mask storage section 151. In this case, the luminance adjustment section 111, the determination section 112, the distribution section 113, the first replacement section 121, the second replacement section 122, the third replacement section 123, the fourth replacement section 124, the fifth replacement section 125, the sixth replacement section 126, the seventh replacement section 127, the eighth replacement section 128, and the generation section 131 are disposed between, for example, the image input section 47 and the image memory 48 shown in FIG. 2.

2. Specific Example of Processing of Control Section and Video Processing Section 2-1. Processing of Determination Section Then, a specific example of the processing of the control section 10 and the video processing section 40 will be described with reference to FIG. 4 through FIG. 10.

Figure 4:
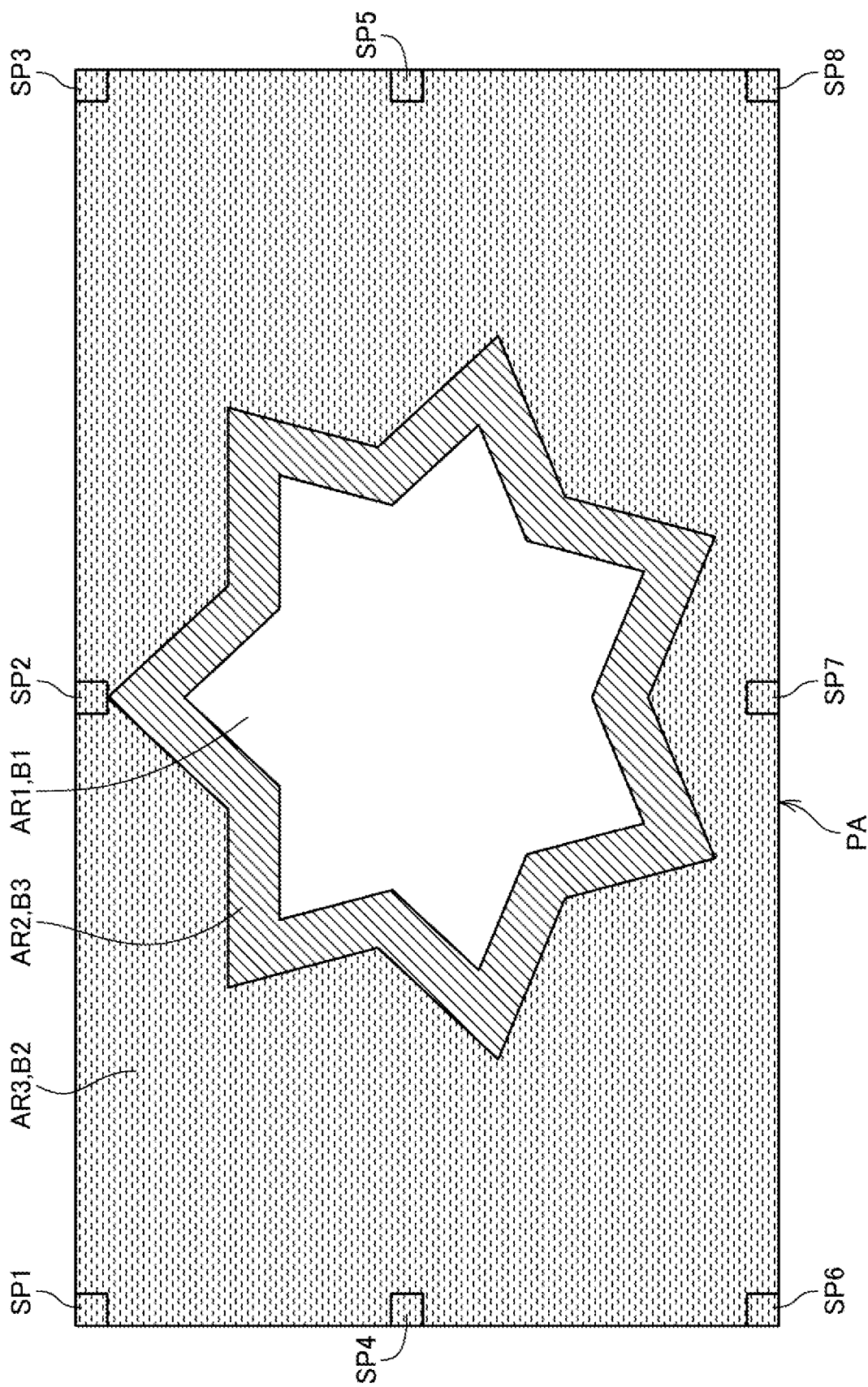
FIG. 4 is a diagram showing an example of an original image.

FIG. 4 is a diagram showing an example of the original image PA. A specific example of the processing of the determination section 112 shown in FIG. 1 will be described with reference to FIG. 4. It should be noted that the original image PA shown in FIG. 4 represents the original image PA adjusted in luminance by the luminance adjustment section 111 shown in FIG. 1. In other words, a maximum value of the luminance value B of the original image PA is the maximum luminance value BX, and a minimum value of the luminance value B of the original image PA is the minimum luminance value BN.

As shown in FIG. 4, the original image PA includes a first area AR1, a second area AR2, and a third area AR3. The third area AR3 is disposed at an outermost side in the original image PA, and includes an outer edge of the original image PA. The second area AR2 is disposed inside the third area AR3, and the first area AR1 is disposed inside the second area AR2.

The luminance value B in the first area AR1 is the first luminance value B1, the luminance value B in the second area AR2 is the third luminance value B3, and the luminance value B in the third area AR3 is the second luminance value B2. The first luminance value B1 is the maximum luminance value BX, the third luminance value B3 is the minimum luminance value BN, and the second luminance value B2 represents the luminance value B at an intermediate gray level. In the present embodiment, there will be described when the second luminance value B2 is a constant luminance value B. The second luminance value B2 is defined by, for example, the following formula (3).

$$B2=(BX+BN)/N \qquad (3)$$

Here, when the luminance value B is expressed in 256 gray levels, the coefficient N is an integer greater than 1 and no greater than 255. The coefficient N is, for example, 2.

On the outer edge of the original image PA, there are disposed a first pixel SP1, a second pixel SP2, a third pixel SP3, a fourth pixel SP4, a fifth pixel SP5, a sixth pixel SP6, a seventh pixel SP7, and an eighth pixel SP8.

Specifically, the first pixel SP1, the third pixel SP3, the sixth pixel SP6, and the eighth pixel SP8 are respectively disposed on the four corners of the original image PA having a rectangular shaped. The second pixel SP2 is disposed at the middle between the first pixel SP1 and the third pixel SP3. The fourth pixel SP4 is disposed at the middle between the first pixel SP1 and the sixth pixel SP6. The fifth pixel SP5 is disposed at the middle between the third pixel SP3 and the eighth pixel SP8. The seventh pixel SP7 is disposed at the middle between the sixth pixel SP6 and the eighth pixel SP8.

The determination section 112 determines whether or not at least one of the respective luminance values B of the first pixel SP1 through the eighth pixel SP8 is the second luminance value B2.

In the present embodiment, since the respective luminance values B of the first pixel SP1 through the eighth pixel SP8 are the second luminance value B2, the determination section 112 determines that at least one of the respective luminance values B of the first pixel SP1 through the eighth pixel SP8 is the second luminance value B2.

In the present embodiment, the determination section 112 determines whether or not at least one of the respective luminance values B of the first pixel SP1 through the eighth pixel SP8 is the second luminance value B2, but the embodiment of the present disclosure is not limited thereto. It is sufficient for the determination section 112 to determine whether or not the luminance value B of the pixel SP constituting the outer edge of the original image PA is the second luminance value B2. The number of the pixels SP used by the determination section 112 for the determination can be one, or can also be two or more.

2-2. Processing of First Replacement Section and Second Replacement Section

Figure 5:
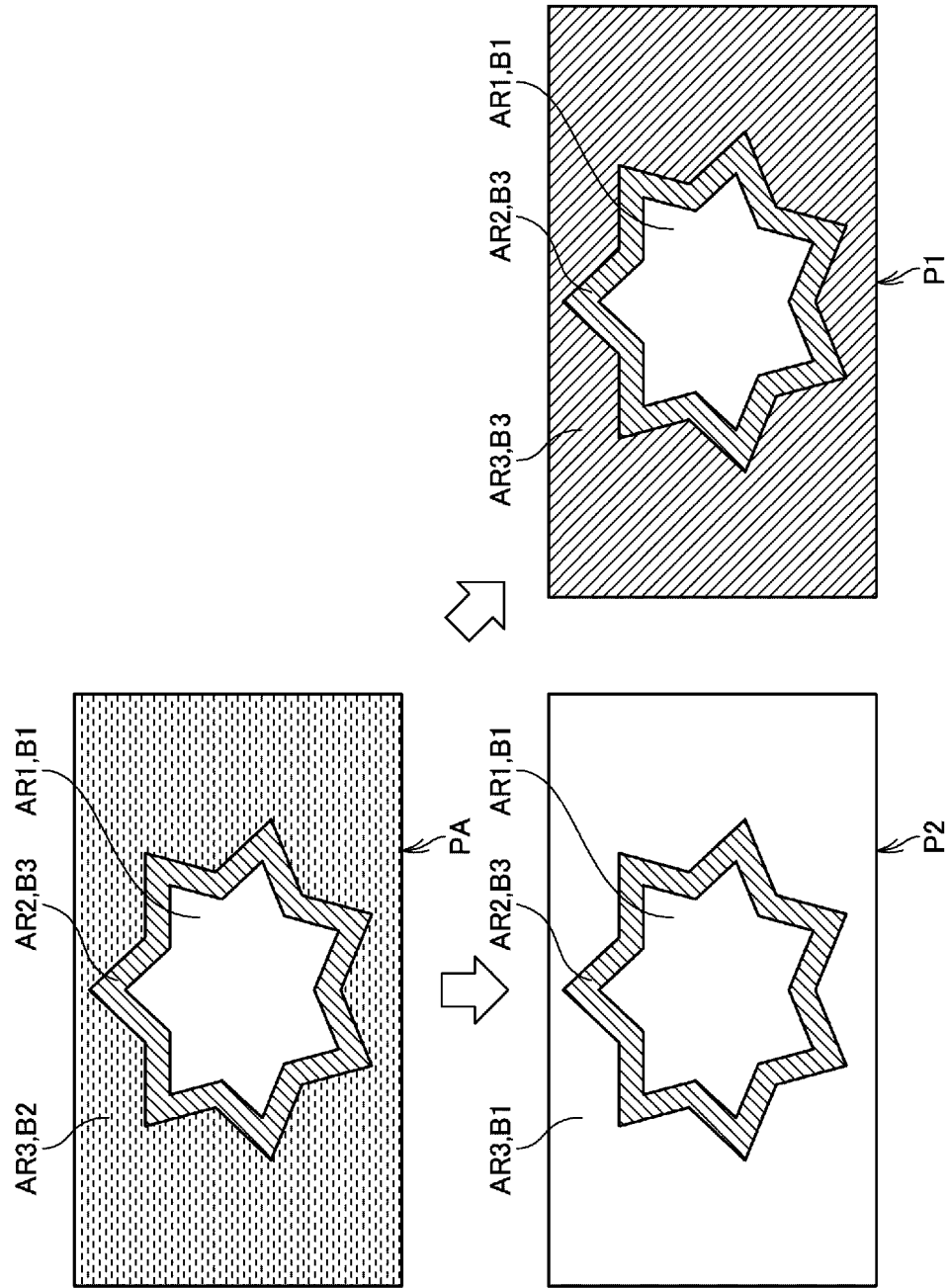
FIG. 5 is a diagram showing an example of processing of a first replacement section and a second replacement section.

FIG. 5 is a diagram showing an example of the processing of the first replacement section 121 and the second replacement section 122.

The upper drawing in FIG. 5 shows an example of the original image PA. The original image PA is the same image as the original image PA shown in FIG. 4. The lower right drawing in FIG. 5 shows an example of the first image P1 to be generated by the first replacement section 121.

The first replacement section 121 replaces the luminance values B of the pixels corresponding to the second luminance value B2 with the third luminance value B3 in the original image PA to generate the first image P1.

In the original image PA, the pixels corresponding to the second luminance value B2 represent the pixels included in the third area AR3. Therefore, the first replacement section 121 replaces the second luminance value B2 as the luminance values B of the pixels included in the third area AR3 with the third luminance value B3 to generate the first image P1. As a result, the first image P1 shown in the lower right drawing in FIG. 5 is generated.

Specifically, the first image P1 includes the first area AR1, the second area AR2, and the third area AR3. In the first image P1, the luminance value B in the first area AR1 is the first luminance value B1, the luminance value B in the second area AR2 is the third luminance value B3, and the luminance value B in the third area AR3 is the third luminance value B3.

The lower left drawing in FIG. 5 shows an example of the second image P2 to be generated by the second replacement section 122.

The second replacement section 122 replaces the luminance values B of the pixels corresponding to the second luminance value B2 with the first luminance value B1 in the original image PA to generate the second image P2.

In the original image PA, the pixels corresponding to the second luminance value B2 represent the pixels included in the third area AR3. Therefore, the second replacement section 122 replaces the second luminance value B2 as the luminance values B of the pixels included in the third area AR3 with the first luminance value B1 to generate the second image P2. As a result, the second image P2 shown in the lower left drawing in FIG. 5 is generated.

Specifically, the second image P2 includes the first area AR1, the second area AR2, and the third area AR3. In the second image P2, the luminance value B in the first area AR1 is the first luminance value B1, the luminance value B in the second area AR2 is the third luminance value B3, and the luminance value B in the third area AR3 is the first luminance value B1.

2-3. Processing of Third Replacement Section and Fourth Replacement Section

Figure 6:
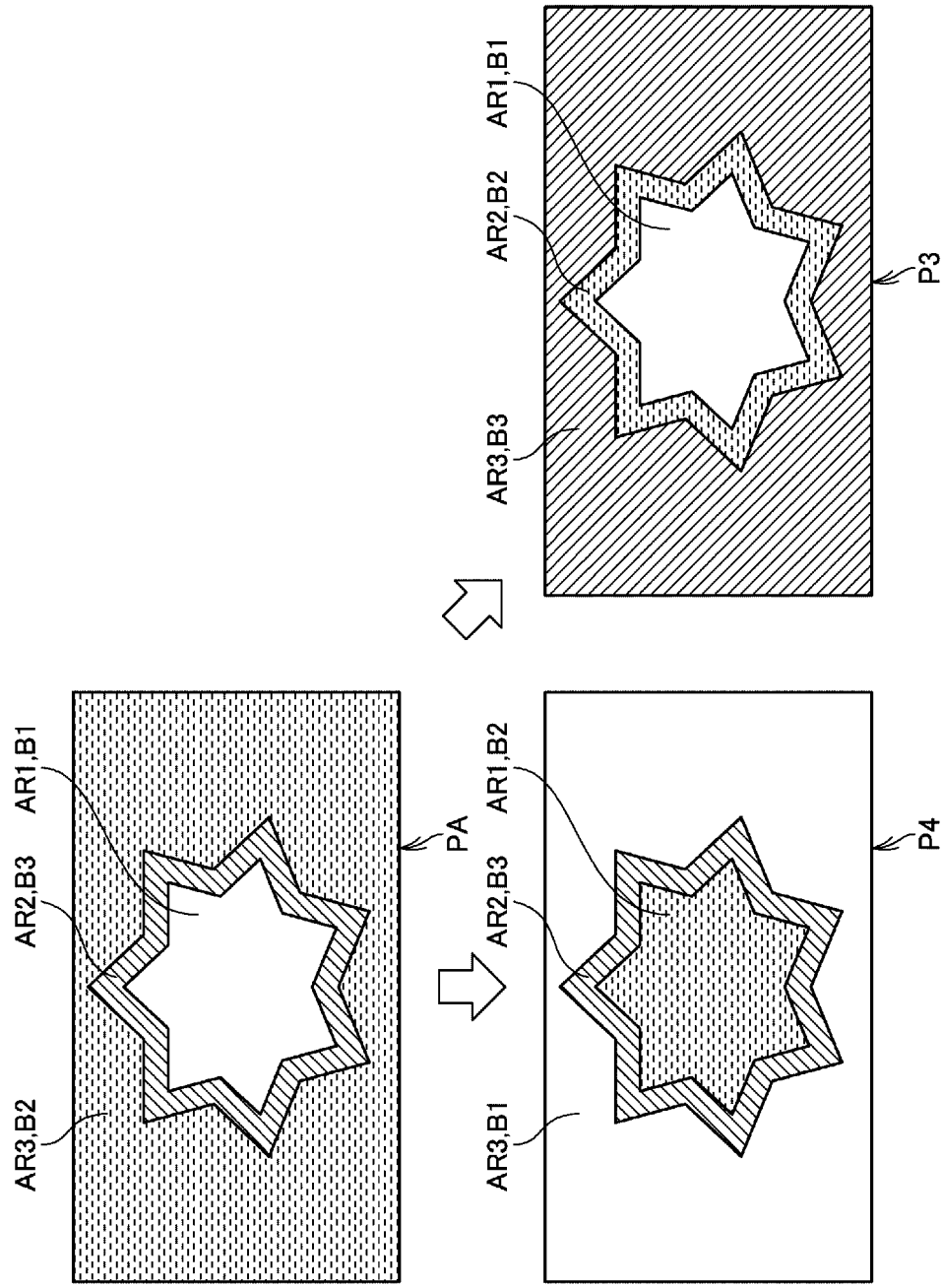
FIG. 6 is a diagram showing an example of processing of a third replacement section and a fourth replacement section.

FIG. 6 is a diagram showing an example of the processing of the third replacement section 123 and the fourth replacement section 124.

The upper drawing in FIG. 6 shows an example of the original image PA. The original image PA is the same image as the original image PA shown in FIG. 4. The lower right drawing in FIG. 6 shows an example of the third image P3 to be generated by the third replacement section 123.

The third replacement section 123 replaces the luminance values B of the pixels corresponding to the second luminance value B2 with the third luminance value B3, and at the same time, replaces the luminance values B of the pixels corresponding to the third luminance value B3 with the second luminance value B2 in the original image PA to generate the third image P3.

In the original image PA, the pixels corresponding to the second luminance value B2 represent the pixels included in the third area AR3. Further, in the original image PA, the pixels corresponding to the third luminance value B3 represent the pixels included in the second area AR2. Therefore, the third replacement section 123 replaces the second luminance value B2 as the luminance values B of the pixels included in the third area AR3 with the third luminance value B3, and at the same time, replaces the third luminance value B3 as the luminance values B of the pixels included in the second area AR2 with the second luminance value B2 to generate the third image P3. As a result, the third image P3 shown in the lower right drawing in FIG. 6 is generated.

Specifically, the third image P3 includes the first area AR1, the second area AR2, and the third area AR3. In the third image P3, the luminance value B in the first area AR1 is the first luminance value B1, the luminance value B in the second area AR2 is the second luminance value B2, and the luminance value B in the third area AR3 is the third luminance value B3.

The lower left drawing in FIG. 6 shows an example of the fourth image P4 to be generated by the fourth replacement section 124.

The fourth replacement section 124 replaces the luminance values B of the pixels corresponding to the second luminance value B2 with the first luminance value B1, and at the same time, replaces the luminance values B of the pixels corresponding to the first luminance value B1 with the second luminance value B2 in the original image PA to generate the fourth image P4.

In the original image PA, the pixels corresponding to the second luminance value B2 represent the pixels included in the third area AR3. Further, in the original image PA, the pixels corresponding to the first luminance value B1 represent the pixels included in the first area AR1. Therefore, the fourth replacement section 124 replaces the second luminance value B2 as the luminance values B of the pixels included in the third area AR3 with the first luminance value B1, and at the same time, replaces the first luminance value B1 as the luminance values B of the pixels included in the first area AR1 with the second luminance value B2 to generate the fourth image P4. As a result, the fourth image P4 shown in the lower left drawing in FIG. 6 is generated.

Specifically, the fourth image P4 includes the first area AR1, the second area AR2, and the third area AR3. In the fourth image P4, the luminance value B in the first area AR1 is the second luminance value B2, the luminance value B in the second area AR2 is the third luminance value B3, and the luminance value B in the third area AR3 is the first luminance value B1.

2-4. Processing of Fifth Replacement Section and Sixth Replacement Section

Figure 7:
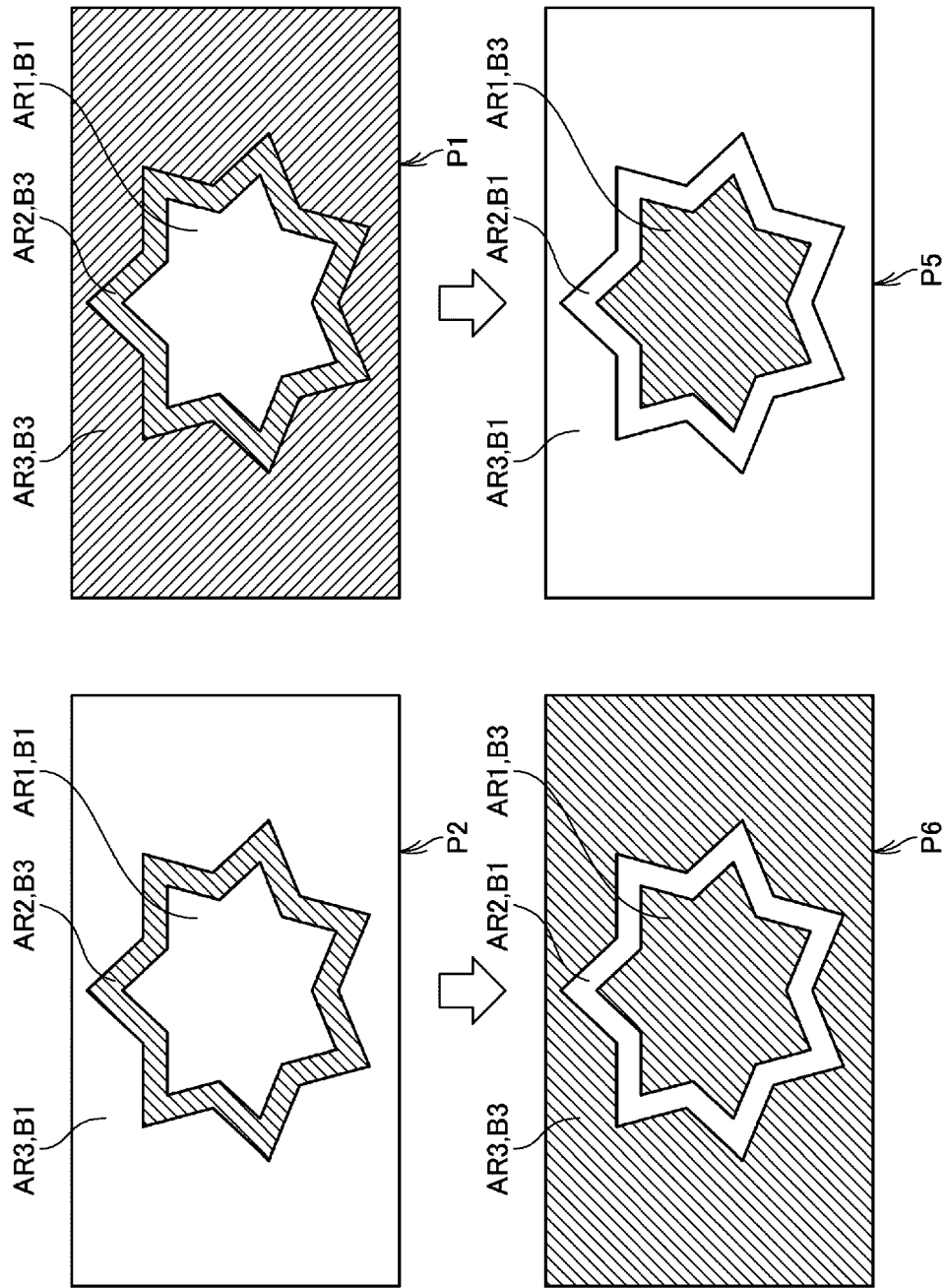
FIG. 7 is a diagram showing an example of processing of a fifth replacement section and a sixth replacement section.

FIG. 7 is a diagram showing an example of the processing of the fifth replacement section 125 and the sixth replacement section 126.

The upper right drawing in FIG. 7 shows an example of the first image P1. The first image P1 is the same image as the first image P1 shown in FIG. 5. The lower right drawing in FIG. 7 shows an example of the fifth image P5 to be generated by the fifth replacement section 125.

The fifth replacement section 125 replaces the luminance values B of the pixels corresponding to the third luminance value B3 with the first luminance value B1, and at the same time, replaces the luminance values B of the pixels corresponding to the first luminance value B1 with the third luminance value B3 in the first image P1 to generate the fifth image P5. In other words, the fifth replacement section 125 reverses the luminance values B in the first image P1 to thereby generate the fifth image P5.

In the first image P1, the pixels corresponding to the third luminance value B3 represent the pixels included in the second area AR2, and the pixels included in the third area AR3. The pixels corresponding to the first luminance value B1 represent the pixels included in the first area AR1. Therefore, the fifth replacement section 125 replaces the third luminance value B3 as the luminance values B of the pixels included in the second area AR2 and the pixels included in the third area AR3 with the first luminance value B1, and at the same time, replaces the first luminance value B1 as the luminance values B of the pixels included in the first area AR1 with the third luminance value B3 to generate the fifth image P5. As a result, the fifth image P5 shown in the lower right drawing in FIG. 7 is generated.

Specifically, the fifth image P5 includes the first area AR1, the second area AR2, and the third area AR3. In the fifth image P5, the luminance value B in the first area AR1 is the third luminance value B3, the luminance value B in the second area AR2 is the first luminance value B1, and the luminance value B in the third area AR3 is the first luminance value B1.

The upper left drawing in FIG. 7 shows an example of the second image P2. The second image P2 is the same image as the second image P2 shown in FIG. 5. The lower left drawing in FIG. 7 shows an example of the sixth image P6 to be generated by the sixth replacement section 126.

The sixth replacement section 126 replaces the luminance values B of the pixels corresponding to the third luminance value B3 with the first luminance value B1, and at the same time, replaces the luminance values B of the pixels corresponding to the first luminance value B1 with the third luminance value B3 in the second image P2 to generate the sixth image P6. In other words, the sixth replacement section 126 reverses the luminance values B in the second image P2 to thereby generate the sixth image P6.

In the second image P2, the pixels corresponding to the third luminance value B3 represent the pixels included in the second area AR2. The pixels corresponding to the first luminance value B1 represent the pixels included in the first area AR1, and the pixels included in the third area AR3. Therefore, the sixth replacement section 126 replaces the third luminance value B3 as the luminance values B of the pixels included in the second area AR2 with the first luminance value B1, and at the same time, replaces the first luminance value B1 as the luminance values B of the pixels included in the first area AR1 and the pixels included in the third area AR3 with the third luminance value B3 to generate the sixth image P6. As a result, the sixth image P6 shown in the lower left drawing in FIG. 7 is generated.

Specifically, the sixth image P6 includes the first area AR1, the second area AR2, and the third area AR3. In the sixth image P6, the luminance value B in the first area AR1 is the third luminance value B3, the luminance value B in the second area AR2 is the first luminance value B1, and the luminance value B in the third area AR3 is the third luminance value B3.

2-5. Processing of Seventh Replacement Section and Eighth Replacement Section

Figure 8:
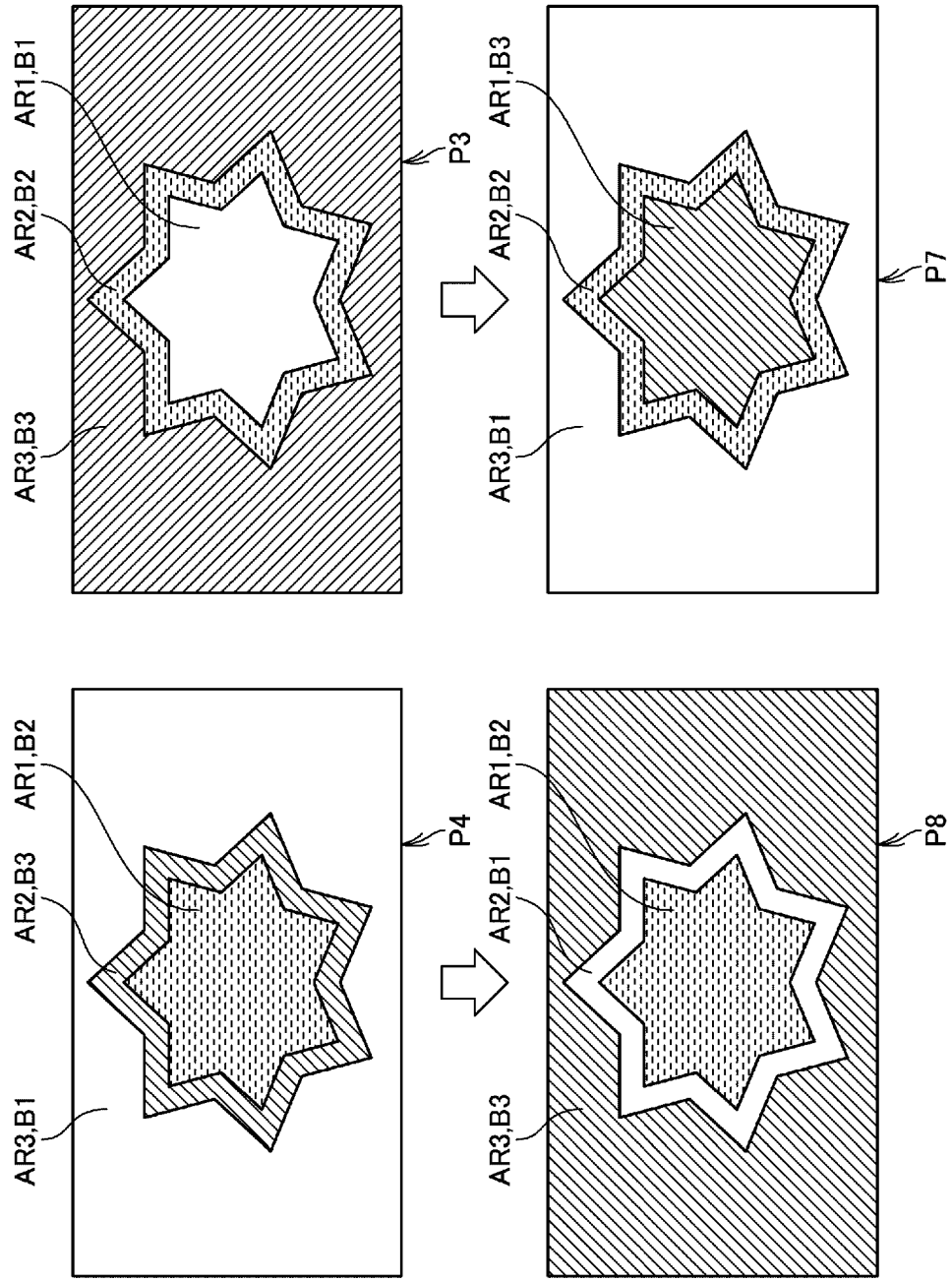
FIG. 8 is a diagram showing an example of processing of a seventh replacement section and an eighth replacement section.

FIG. 8 is a diagram showing an example of the processing of the seventh replacement section 127 and the eighth replacement section 128.

The upper right drawing in FIG. 8 shows an example of the third image P3. The third image P3 is the same image as the third image P3 shown in FIG. 6. The lower right drawing in FIG. 8 shows an example of the seventh image P7 to be generated by the seventh replacement section 127.

The seventh replacement section 127 replaces the luminance values B of the pixels corresponding to the third luminance value B3 with the first luminance value B1, and at the same time, replaces the luminance values B of the pixels corresponding to the first luminance value B1 with the third luminance value B3 in the third image P3 to generate the seventh image P7. In other words, the seventh replacement section 127 reverses the luminance values B in the third image P3 to thereby generate the seventh image P7.

In the third image P3, the pixels corresponding to the third luminance value B3 represent the pixels included in the third area AR3. The pixels corresponding to the first luminance value B1 represent the pixels included in the first area AR1. Therefore, the seventh replacement section 127 replaces the third luminance value B3 as the luminance values B of the pixels included in the third area AR3 with the first luminance value B1, and at the same time, replaces the first luminance value B1 as the luminance values B of the pixels included in the third area AR3 with the third luminance value B3 to generate the seventh image P7. As a result, the seventh image P7 shown in the lower right drawing in FIG. 8 is generated.

Specifically, the seventh image P7 includes the first area AR1, the second area AR2, and the third area AR3. In the seventh image P7, the luminance value B in the first area AR1 is the third luminance value B3, the luminance value B in the second area AR2 is the second luminance value B2, and the luminance value B in the third area AR3 is the first luminance value B1.

The upper left drawing in FIG. 8 shows an example of the fourth image P4. The fourth image P4 is the same image as the fourth image P4 shown in FIG. 6. The lower left drawing in FIG. 8 shows an example of the eighth image P8 to be generated by the eighth replacement section 128.

The eighth replacement section 128 replaces the luminance values B of the pixels corresponding to the third luminance value B3 with the first luminance value B1, and at the same time, replaces the luminance values B of the pixels corresponding to the first luminance value B1 with the third luminance value B3 in the fourth image P4 to generate the eighth image P8. In other words, the eighth replacement section 128 reverses the luminance values B in the fourth image P4 to thereby generate the eighth image P8.

In the fourth image P4, the pixels corresponding to the third luminance value B3 represent the pixels included in the second area AR2. The pixels corresponding to the first luminance value B1 represent the pixels included in the third area AR3. Therefore, the eighth replacement section 128 replaces the third luminance value B3 as the luminance values B of the pixels included in the second area AR2 with the first luminance value B1, and at the same time, replaces the first luminance value B1 as the luminance values B of the pixels included in the third area AR3 with the third luminance value B3 to generate the eighth image P8. As a result, the eighth image P8 shown in the lower left drawing in FIG. 8 is generated.

Specifically, the eighth image P8 includes the first area AR1, the second area AR2, and the third area AR3. In the eighth image P8, the luminance value B in the first area AR1 is the second luminance value B2, the luminance value B in the second area AR2 is the first luminance value B1, and the luminance value B in the third area AR3 is the third luminance value B3.

2-6. Processing of Generation Section and Combining Section

Figure 9:
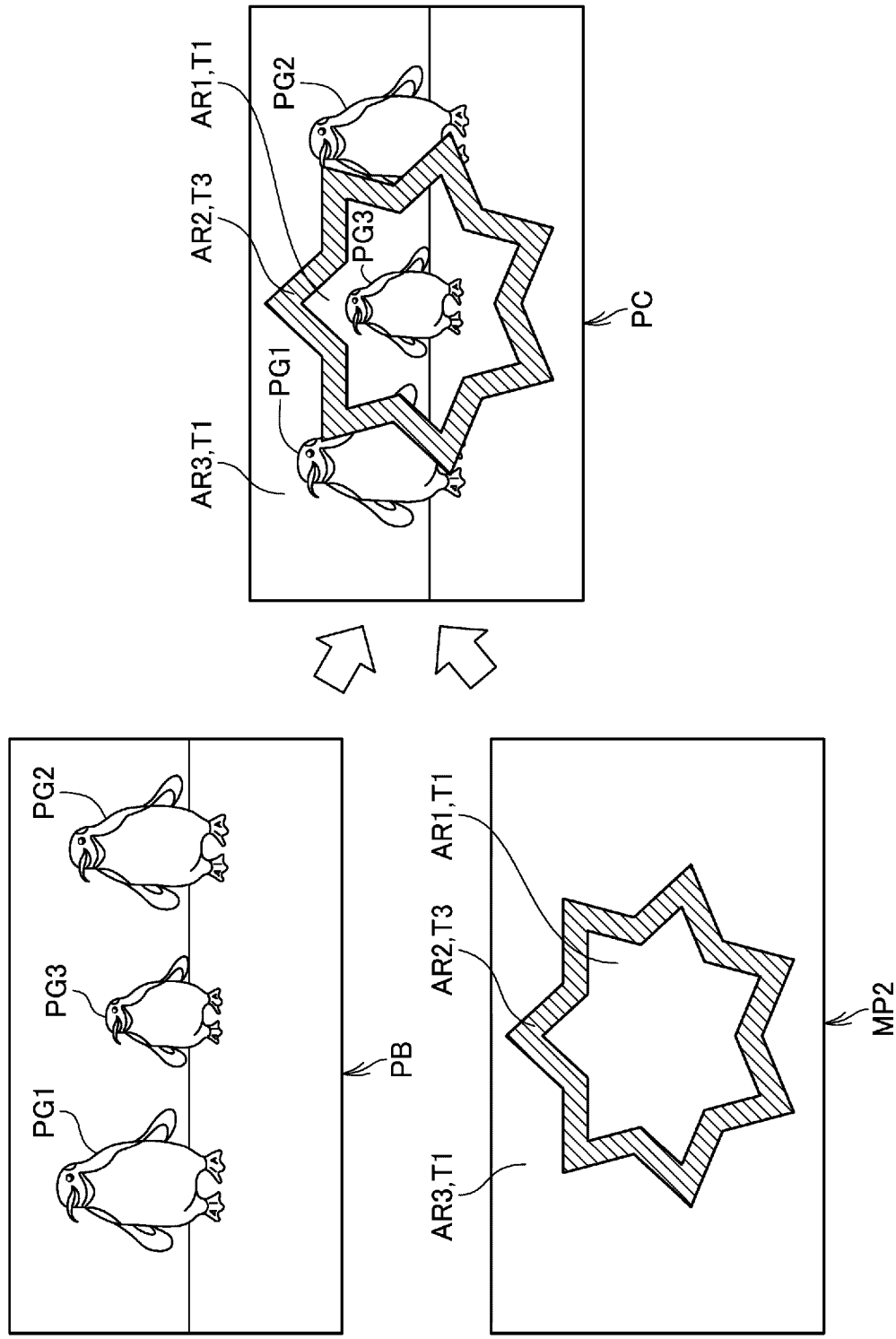
FIG. 9 is a diagram showing an example of processing of a generation section and a combining section.

FIG. 9 is a diagram showing an example of the processing of the generation section 131 and the combining section 43c.

The upper left drawing in FIG. 9 shows an example of the input image PB to be input from the signal processing section 42 shown in FIG. 2. The input image PB includes a first penguin image PG1, a second penguin image PG2, and a third penguin image PG3.

The lower left drawing in FIG. 9 shows the second mask image MP2 as an example of the mask image MPS. The generation section 131 converts the luminance value B of each of the pixels of the second image P2 shown in FIG. 5 into the transmittance T to generate the second mask image MP2. In the present embodiment, the generation section 131 converts the luminance value B into the transmittance T so that the higher the luminance value B is, the higher the transmittance T is.

Specifically, the generation section 131 converts the first luminance value B1 into a first transmittance T1, converts the second luminance value B2 into a second transmittance T2, and converts the third luminance value B3 into a third transmittance T3. The first transmittance T1 is higher than the second transmittance T2, and the second transmittance T2 is higher than the third transmittance T3. The first transmittance T1 represents the fact that, for example, the transmittance T is 100%, the second transmittance T2 represents the fact that, for example, the transmittance T is 50%, and the third transmittance T3 represents the fact that, for example, the transmittance T is 0%.

The second mask image MP2 shown in the lower left drawing in FIG. 9 includes the first area AR1, the second area AR2, and the third area AR3. In the second mask image MP2, the transmittance T in the first area AR1 is the first transmittance T1, the transmittance T in the second area AR2 is the third transmittance T3, and the transmittance T in the third area AR3 is the first transmittance T1.

In FIG. 9, there is described when the selection section 132 selects the second mask image MP2.

In this case, the combining section 43c combines the input image PB and the second mask image MP2 so as to be superimposed on each other to generate the composite image PC.

The right drawing in FIG. 9 shows an example of the composite image PC. Since the transmittance T in the first area AR1 and the third area AR3 is the first transmittance T1 in the second mask image MP2, the input image PB is visually recognized in the first area AR1 and the third area AR3. In contrast, since the transmittance T in the second area AR2 is the third transmittance T3 in the second mask image MP2, the input image PB cannot visually be recognized. As a result, the third penguin image PG3 included in the input image PB can visually be recognized, but a part of the first penguin image PG1 and a part of the second penguin image PG2 included in the input image PB cannot visually be recognized.

Figure 10:
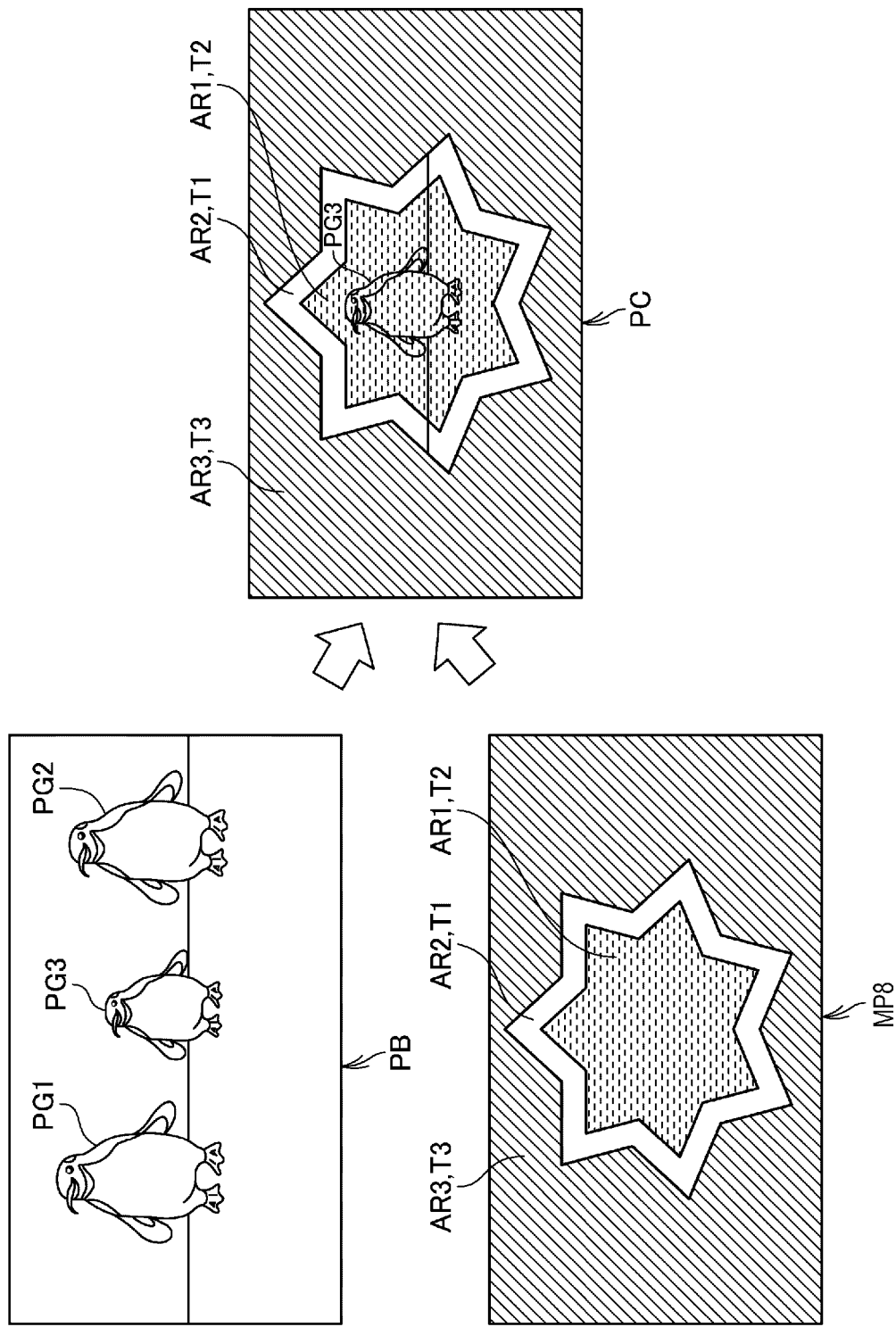
FIG. 10 is a diagram showing another example of the processing of the generation section and the combining section.

FIG. 10 is a diagram showing another example of the processing of the generation section 131 and the combining section 43c.

FIG. 10 is different in that the selection section 132 selects the eighth mask image MP8 from FIG. 9 in which the selection section 132 selects the second mask image MP2. In the following description, the difference from FIG. 9 will mainly be described.

The lower left drawing in FIG. 10 shows the eighth mask image MP8 as an example of the mask image MPS. The generation section 131 converts the luminance value B of each of the pixels of the eighth image P8 into the transmittance T to generate the eighth mask image MP8.

The eighth mask image MP8 shown in the lower left drawing in FIG. 10 includes the first area AR1, the second area AR2, and the third area AR3. In the eighth mask image MP8, the transmittance T in the first area AR1 is the second transmittance T2, the transmittance T in the second area AR2 is the first transmittance T1, and the transmittance T in the third area AR3 is the third transmittance T3.

The combining section 43c combines the input image PB and the eighth mask image MP8 so as to be superimposed on each other to generate the composite image PC.

The right drawing in FIG. 10 shows an example of the composite image PC. Since the transmittance T in the second area AR2 is the first transmittance T1 in the eighth mask image MP8, the input image PB is visually recognized in the second area AR2. Further, since the transmittance T in the first area AR1 is the second transmittance T2, the input image PB is visually recognized more darkly than in the second area AR2. In contrast, since the transmittance T in the third area AR3 is the third transmittance T3 in the eighth mask image MP8, the input image PB cannot visually be recognized. As a result, the first penguin image PG1 and the second penguin image PG2 included in the input image PB cannot be recognized, and the third penguin image PG3 can visually be recognized darkly.

3. Processing of Control Section and Video Processing Section

Figure 11:
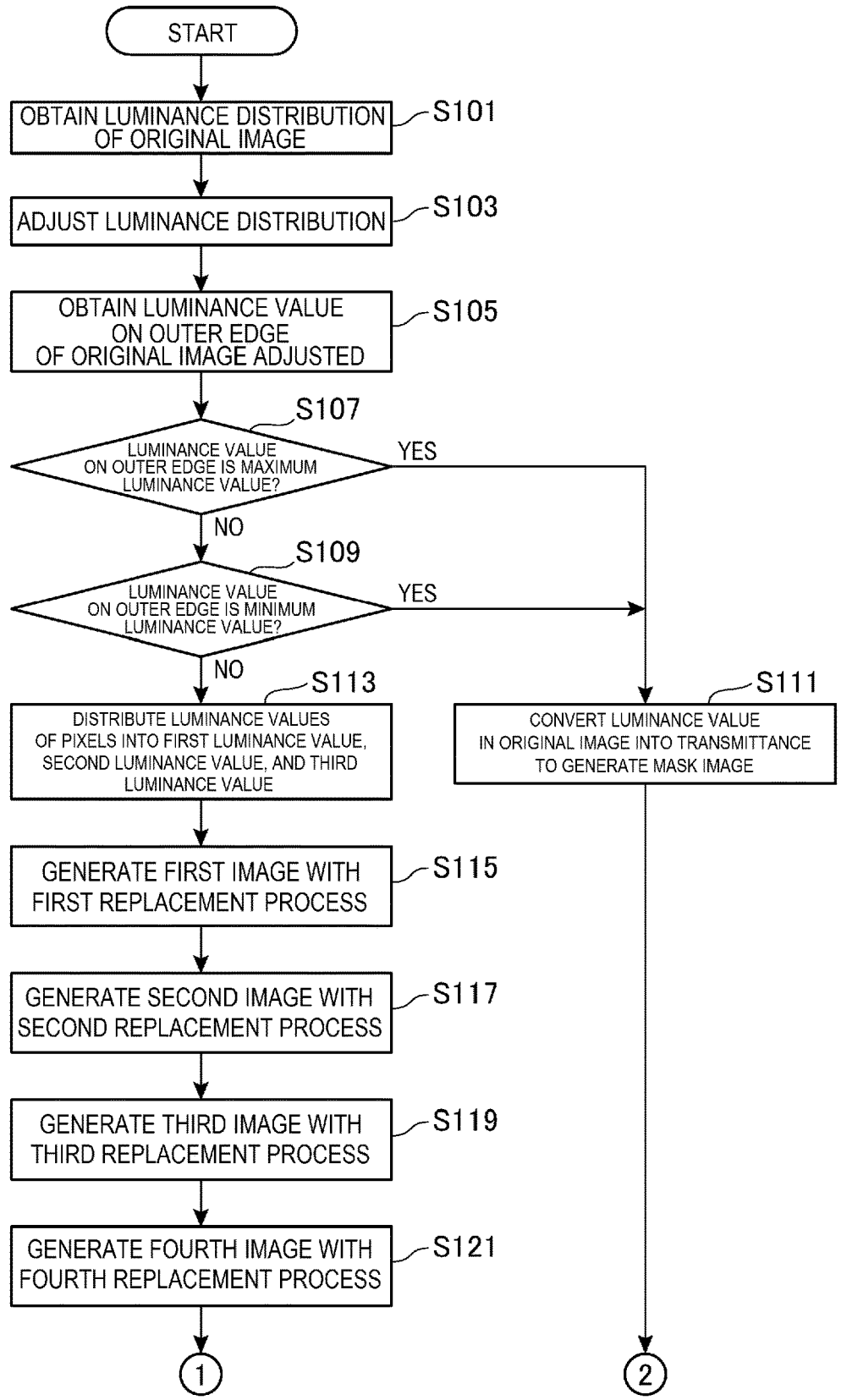
FIG. 11 is a flowchart showing an example of processing of a control section and an image processing section.
Figure 12:
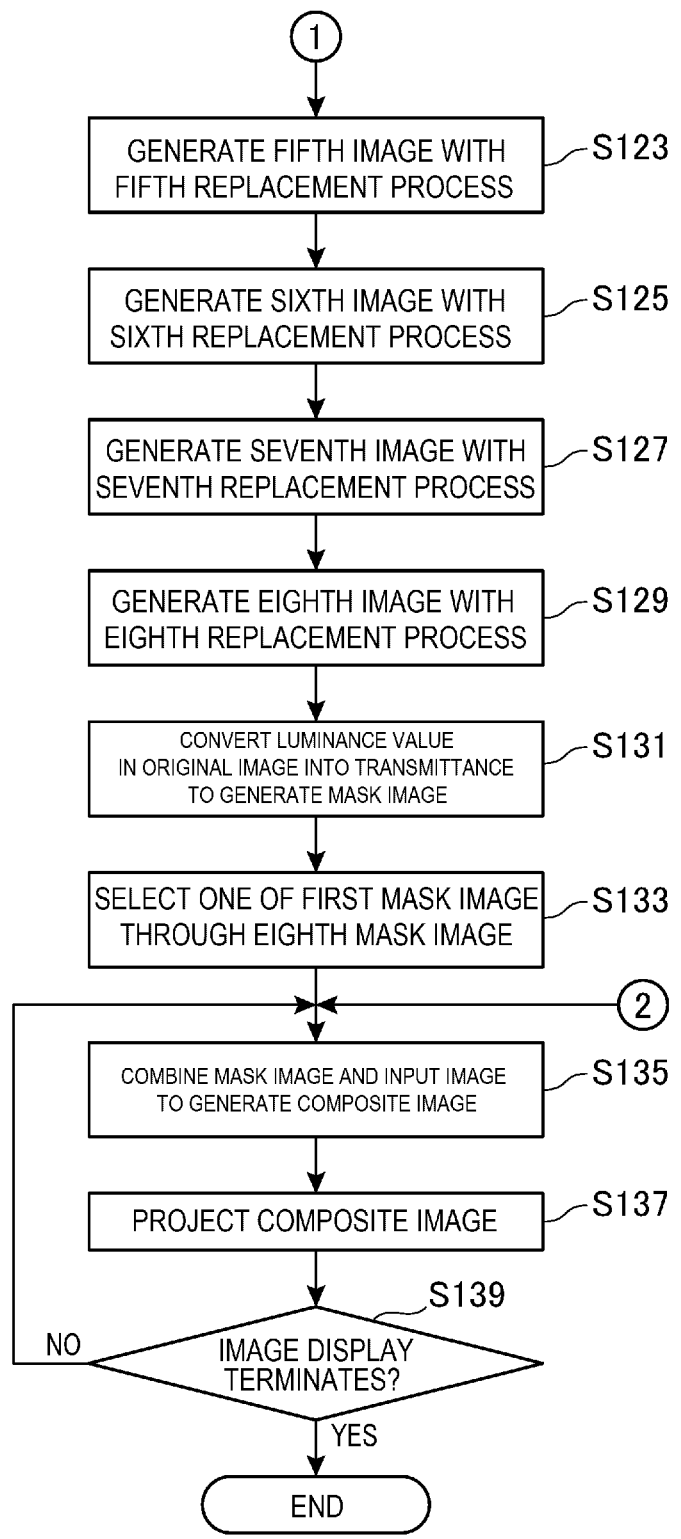
FIG. 12 is a flowchart showing an example of the processing of the control section and the image processing section.

FIG. 11 and FIG. 12 area flowchart showing an example of the processing of the control section 10 and the video processing section 40.

As shown in FIG. 11, first, in the step S101, the luminance adjustment section 111 obtains the luminance distribution of the original image PA. Specifically, the luminance adjustment section 111 obtains the first luminance value BA1 and the third luminance value BA3. The first luminance value BA1 represents the highest one of the luminance values BA of the pixels constituting the original image PA. The third luminance value BA3 represents the lowest one of the luminance values BA of the pixels constituting the original image PA.

Then, in the step S103, the luminance adjustment section 111 adjusts the luminance value BA of the pixels constituting the original image PA into the luminance value B so that the first luminance value BA1 of the pixel of the original image PA becomes the maximum luminance value BX, and the third luminance value BA3 of the pixel of the original image PA becomes the minimum luminance value BN.

Then, in the step S105, the determination section 112 obtains the luminance values B of the pixels constituting the outer edge of the original image PA.

Then, in the step S107, the determination section 112 determines whether or not the luminance values B of the pixels constituting the outer edge of the original image PA are the maximum luminance value BX.

When the determination section 112 has determined that the luminance values B of the pixels constituting the outer edge of the original image PA are the maximum luminance value BX (YES in the step S107), the process proceeds to the step S111. When the determination section 112 has determined that the luminance values B of the pixels constituting the outer edge of the original image PA are not the maximum luminance value BX (NO in the step S107), the process proceeds to the step S109.

Then, in the step S109, the determination section 112 determines whether or not the luminance values B of the pixels constituting the outer edge of the original image PA are the minimum luminance value BN.

When the determination section 112 has determined that the luminance values B of the pixels constituting the outer edge of the original image PA are the minimum luminance value BN (YES in the step S109), the process proceeds to the step S111.

Then, in the step S111, the generation section 131 converts the luminance value B of each of the pixels in the original image PA into the transmittance T to generate the mask image MPA, and then records the mask image MPA thus generated on the mask storage section 151. Subsequently, the process proceeds to the step S135 shown in FIG. 12.

When the determination section 112 has determined that the luminance values B of the pixels constituting the outer edge of the original image PA are not the minimum luminance value BN (NO in the step S109), the process proceeds to the step S113.

Then, in the step S113, the distribution section 113 distributes the luminance values B of the pixels of the original image PA into the first luminance value B1, the second luminance value B2, and the third luminance value B3. The first luminance value B1 is the maximum luminance value BX, the third luminance value B3 is the minimum luminance value BN, and the second luminance value B2 represents the luminance value B at an intermediate gray level.

Then, in the step S115, the first replacement section 121 executes a first replacement process to generate the first image P1. The first replacement process represents the processing of replacing the luminance values B of the pixels corresponding to the second luminance value B2 in the original image PA with the third luminance value B3.

Then, in the step S117, the second replacement section 122 executes a second replacement process to generate the second image P2. The second replacement process represents the processing of replacing the luminance values B of the pixels corresponding to the second luminance value B2 in the original image PA with the first luminance value B1.

Then, in the step S119, the third replacement section 123 executes a third replacement process to generate the third image P3. The third replacement process represents the processing of replacing the luminance values B of the pixels corresponding to the second luminance value B2 in the original image PA with the third luminance value B3, and at the same time, replacing the luminance values B of the pixels corresponding to the third luminance value B3 with the second luminance value B2.

Then, in the step S121, the fourth replacement section 124 executes a fourth replacement process to generate the fourth image P4. The fourth replacement process represents the processing of replacing the luminance values B of the pixels corresponding to the second luminance value B2 in the original image PA with the first luminance value B1, and at the same time, replacing the luminance values B of the pixels corresponding to the first luminance value B1 with the second luminance value B2.

Then, as shown in FIG. 12, in the step S123, the fifth replacement section 125 executes a fifth replacement process to generate the fifth image P5. The fifth replacement process represents the processing of replacing the luminance values B of the pixels corresponding to the third luminance value B3 in the first image P1 with the first luminance value B1, and at the same time, replacing the luminance values B of the pixels corresponding to the first luminance value B1 with the third luminance value B3.

Then, in the step S125, the sixth replacement section 126 executes a sixth replacement process to generate the sixth image P6. The sixth replacement process represents the processing of replacing the luminance values B of the pixels corresponding to the third luminance value B3 in the second image P2 with the first luminance value B1, and at the same time, replacing the luminance values B of the pixels corresponding to the first luminance value B1 with the third luminance value B3.

Then, in the step S127, the seventh replacement section 127 executes a seventh replacement process to generate the seventh image P7.

The seventh replacement process represents the processing of replacing the luminance values B of the pixels corresponding to the third luminance value B3 in the third image P3 with the first luminance value B1, and at the same time, replacing the luminance values B of the pixels corresponding to the first luminance value B1 with the third luminance value B3.

Then, in the step S129, the eighth replacement section 128 executes an eighth replacement process to generate the eighth image P8. The eighth replacement process represents the processing of replacing the luminance values B of the pixels corresponding to the third luminance value B3 in the fourth image P4 with the first luminance value B1, and at the same time, replacing the luminance values B of the pixels corresponding to the first luminance value B1 with the third luminance value B3.

Then, in the step S131, the generation section 131 converts the luminance values B of the pixels into the transmittances T with respect to the first image P1 through the eighth image P8 to generate the first mask image MP1 through the eighth mask image MP8, and then records the first mask image MP1 through the eighth mask image MP8 on the mask storage section 151.

Then, in the step S133, the selection section 132 selects a mask image MPS from the first mask image MP1 through the eighth mask image MP8 based on the operation from the user.

Then, in the step S135, the combining section 43c superimposes the mask image MPS on the input image PB input from the signal processing section 42 to thereby combine the input image PB and the mask image MPS with each other to generate the composite image PC.

Then, in the step S137, the control section 10 projects the composite image PC to the screen SC via the image forming section 20.

Then, in the step S139, the control section 10 determines whether or not the display of the composite image PC to the screen SC is to be terminated.

When the control section 10 has determined that the display of the composite image PC to the screen SC is not terminated (NO in the step S139), the process returns to the step S135. When the control section 10 has determined that the display of the composite image PC to the screen SC is to be terminated (YES in the step S139), the process terminates.

The step S107 and the step S109 correspond to an example of a "determining step." The step S113 corresponds to an example of a "distributing step." The step S115 corresponds to an example of a "first replacing step." The step S117 corresponds to an example of a "second replacing step." The step S119 corresponds to an example of a "third replacing step." The step S121 corresponds to an example of a "fourth replacing step." The step S123 corresponds to an example of a "fifth replacing step." The step S125 corresponds to an example of a "sixth replacing step." The step S127 corresponds to an example of a "seventh replacing step." The step S129 corresponds to an example of an "eighth replacing step." The step S111 and the step S131 each correspond to an example of a "generating step."

4. Functions and Advantages of Present Embodiment

As described hereinabove with reference to FIG. 1 through FIG. 12, the method of controlling the projector 1 according to the present embodiment includes the distributing step of distributing each of the luminance values B of the plurality of pixels constituting the original image PA into the first luminance value B1, the second luminance value B2 lower than the first luminance value B1, and the third luminance value B3 lower than the second luminance value B2, the first replacing step of replacing the luminance values B of the pixels corresponding to the second luminance value B2 with the third luminance value B3 in the original image PA to generate the first image P1, the second replacing step of replacing the luminance values B of the pixels corresponding to the second luminance value B2 with the first luminance value B1 in the original image PA to generate the second image P2, and the generating step of converting the luminance values B of the pixels into the transmittances T in each of the first image P1 and the second image P2 to generate the mask images MP.

Therefore, since the luminance values B of the pixels corresponding to the second luminance value B2 are replaced with the third luminance value B3 in the original image PA to generate the first image P1, and the luminance values B of the pixels corresponding to the second luminance value B2 are replaced with the first luminance value B1 in the original image PA to generate the second image P2, it is possible to generate the first image P1 and the second image P2 each consisting of the pixels the luminance values B of which are the first luminance value B1 and the pixels the luminance values B of which are the third luminance value B3. Further, since the mask image MP is generated by converting the luminance values B of the pixels into the transmittances T in each of the first image P1 and the second image P2, it is possible to generate the mask images MP each consisting of the pixels the transmittances T of which are the first transmittance T1 corresponding to the first luminance value B1 and the pixels the transmittances T of which are the third transmittance T3 corresponding to the third luminance value B3. Therefore, it is possible to increase the possibility of generating the mask image MP desired by the user.

Further, there are included the third replacing step of replacing the luminance values B of the pixels corresponding to the second luminance value B2 with the third luminance value B3, and at the same time, replacing the luminance values B of the pixels corresponding to the third luminance value B3 with the second luminance value B2 in the original image PA to generate the third image P3, and the fourth replacing step of replacing the luminance values B of the pixels corresponding to the second luminance value B2 with the first luminance value B1, and at the same time, replacing the luminance values B of the pixels corresponding to the first luminance value B1 with the second luminance value B2 in the original image PA to generate the fourth image P4, and in the generating step, the luminance value B of each of the pixels is converted into the transmittance T in each of the third image P3 and the fourth image P4 to generate the mask images MP.

Therefore, since the luminance values B of the pixels corresponding to the second luminance value B2 are replaced with the third luminance value B3, and at the same time, the luminance values B of the pixels corresponding to the third luminance value B3 are replaced with the second luminance value B2 in the original image PA to generate the third image P3, it is possible to generate the third image P3 in which the luminance values B in an area including the outer edge are the third luminance value B3 when, for example, the luminance values B in an area including the outer edge of the original image PA are the second luminance value B2. Further, since the luminance values B of the pixels corresponding to the second luminance value B2 are replaced with the first luminance value B1, and at the same time, the luminance values B of the pixels corresponding to the first luminance value B1 are replaced with the second luminance value B2 in the original image PA to generate the fourth image P4, it is possible to generate the fourth image P4 in which the luminance values B in an area including the outer edge are the first luminance value B1 when, for example, the luminance values B in an area including the outer edge of the original image PA are the second luminance value B2. Further, since the mask image MP is generated by converting the luminance values B of the pixels into the transmittances T in each of the third image P3 and the fourth image P4, it is possible to generate the mask images MP in which the transmittances T in the area including the outer edge are the first transmittance T1 corresponding to the first luminance value B1 or the third transmittance T3 corresponding to the third luminance value B3. Therefore, it is possible to further increase the possibility of generating the mask image MP desired by the user.

Further, there are included the fifth replacing step of replacing the luminance values B of the pixels corresponding to the third luminance value B3 with the first luminance value B1, and at the same time, replacing the luminance values B of the pixels corresponding to the first luminance value B1 with the third luminance value B3 in the first image P1 to generate the fifth image P5, and the sixth replacing step of replacing the luminance values B of the pixels corresponding to the third luminance value B3 with the first luminance value B1, and at the same time, replacing the luminance values B of the pixels corresponding to the first luminance value B1 with the third luminance value B3 in the second image P2 to generate the sixth image P6, and in the generating step, the luminance value B of each of the pixels is converted into the transmittance T in each of the fifth image P5 and the sixth image P6 to generate the mask images MP.

Therefore, since the luminance values B of the pixels corresponding to the third luminance value B3 are replaced with the first luminance value B1, and at the same time, the luminance values B of the pixels corresponding to the first luminance value B1 are replaced with the third luminance value B3 in the first image P1 to generate the fifth image P5, and the luminance values B of the pixels corresponding to the third luminance value B3 are replaced with the first luminance value B1, and at the same time, the luminance values B of the pixels corresponding to the first luminance value B1 are replaced with the third luminance value B3 in the second image P2 to generate the sixth image P6, it is possible to generate the fifth image P5 and the sixth image P6 each consisting of the pixels the luminance values B of which are the first luminance value B1 and the pixels the luminance values B of which are the third luminance value B3. Further, since the mask image MP is generated by converting the luminance values B of the pixels into the transmittances T in each of the fifth image P5 and the sixth image P6, it is possible to generate the mask images MP each consisting of the pixels the transmittances T of which are the first transmittance T1 corresponding to the first luminance value B1 and the pixels the transmittances T of which are the third transmittance T3 corresponding to the third luminance value B3. Therefore, it is possible to increase the possibility of generating the mask image MP desired by the user.

Further, there are included the seventh replacing step of replacing the luminance values B of the pixels corresponding to the third luminance value B3 with the first luminance value B1, and at the same time, replacing the luminance values B of the pixels corresponding to the first luminance value B1 with the third luminance value B3 in the third image P3 to generate the seventh image P7, and the eighth replacing step of replacing the luminance values B of the pixels corresponding to the third luminance value B3 with the first luminance value B1, and at the same time, replacing the luminance values B of the pixels corresponding to the first luminance value B1 with the third luminance value B3 in the fourth image P4 to generate the eighth image P8, and in the generating step, the luminance value B of each of the pixels is converted into the transmittance T in each of the seventh image P7 and the eighth image P8 to generate the mask images MP.

Therefore, since the luminance values B of the pixels corresponding to the third luminance value B3 are replaced with the first luminance value B1, and at the same time, the luminance values B of the pixels corresponding to the first luminance value B1 are replaced with the third luminance value B3 in the third image P3 to generate the seventh image P7, it is possible to generate the seventh image P7 in which the luminance values B in an area including the outer edge are the first luminance value B1 when, for example, the luminance values B in an area including the outer edge of the original image PA are the second luminance value B2. Further, since the luminance values B of the pixels corresponding to the third luminance value B3 are replaced with the first luminance value B1, and at the same time, the luminance values B of the pixels corresponding to the first luminance value B1 are replaced with the third luminance value B3 in the fourth image P4 to generate the eighth image P8, it is possible to generate the eighth image P8 in which the luminance values B in an area including the outer edge are the third luminance value B3 when, for example, the luminance values B in an area including the outer edge of the original image PA are the second luminance value B2. Further, since the mask image MP is generated by converting the luminance values B of the pixels into the transmittances T in each of the seventh image P7 and the eighth image P8, it is possible to generate the mask images MP in which the transmittances T in the area including the outer edge are the first transmittance T1 corresponding to the first luminance value B1 or the third transmittance T3 corresponding to the third luminance value B3. Therefore, it is possible to further increase the possibility of generating the mask image MP desired by the user.

Further, the first luminance value B1 represents the maximum luminance value BX, and the third luminance value B3 represents the minimum luminance value BN.

Further, for example, in each of the first image P1 and the second image P2, the luminance values B of the pixels are converted into the transmittances T in each of the first image P1 and the second image P2 to generate the mask images MP. Therefore, it is possible to generate the mask images MP each consisting of the pixels the transmittances T of which correspond to the maximum luminance value BX and the pixels the transmittance T of which correspond to the minimum luminance value BN. Therefore, it is possible to increase the possibility of generating the mask image desired by the user.

Further, there is further included the determining step of determining whether or not the luminance values B of the pixels constituting the outer edge of the original image PA are the second luminance value B2, and when it has been determined in the determining step that the luminance values B of the pixels constituting the outer edge of the original image PA are not the second luminance value B2, the luminance values B of the pixels are converted, in the generating step, into the transmittances T in the original image PA to generate the mask image MP.

Therefore, when it is determined that the luminance values B of the pixels constituting the outer edge of the original image PA are not the second luminance value B2, namely when the luminance values B of the pixels constituting the outer edge of the original image PA are the first luminance value B1 or the third luminance value B3, the luminance values B of the pixels are converted into the transmittances T in the original image PA to generate the mask image MP. Therefore, it is possible to generate the mask image MP in which the transmittance T in the area including the outer edge is the first transmittance T1 corresponding to the first luminance value B1 or the third transmittance T3 corresponding to the third luminance value B3. As a result, it is possible to increase the possibility of generating the mask image MP desired by the user.

Further, the projector 1 is provided with the distribution section 113 for distributing each of the luminance values B of the plurality of pixels constituting the original image PA into the first luminance value B1, the second luminance value B2 lower than the first luminance value B1, and the third luminance value B3 lower than the second luminance value B2, the first replacement section 121 for replacing the luminance values B of the pixels corresponding to the second luminance value B2 with the third luminance value B3 in the original image PA to generate the first image P1, the second replacement section 122 for replacing the luminance values B of the pixels corresponding to the second luminance value B2 with the first luminance value B1 in the original image PA to generate the second image P2, and the generation section 131 for converting the luminance values B of the pixels into the transmittances T in each of the first image P1 and the second image P2 to generate the mask images MP.

Therefore, since the luminance values B of the pixels corresponding to the second luminance value B2 are replaced with the third luminance value B3 in the original image PA to generate the first image P1, and the luminance values B of the pixels corresponding to the second luminance value B2 are replaced with the first luminance value B1 in the original image PA to generate the second image P2, it is possible to generate the first image P1 and the second image P2 each consisting of the pixels the luminance values B of which are the first luminance value B1 and the pixels the luminance values B of which are the third luminance value B3. Further, since the mask image MP is generated by converting the luminance values B of the pixels into the transmittances T in each of the first image P1 and the second image P2, it is possible to generate the mask images MP each consisting of the pixels the transmittances T of which are the first transmittance T1 corresponding to the first luminance value B1 and the pixels the transmittances T of which are the third transmittance T3 corresponding to the third luminance value B3. Therefore, it is possible to increase the possibility of generating the mask image MP desired by the user.

5. Other Embodiments

The present embodiment described above is a preferred embodiment. It should be noted that the embodiment described above is not a limitation, but a variety of modified implementation are possible within the scope or the spirit.

In the present embodiment, the "display device" is the projector 1, but the embodiment of the present disclosure is not limited thereto. It is sufficient for the "display device" to generate the composite image PC obtained by combining the mask image MP and the input image PB with each other, and then display the composite image PC. It is possible for the "display device" to be formed of, for example, an LCD (Liquid Crystal Display).

In the present embodiment, the luminance adjustment section 111 adjusts the luminance values BA of the pixels of the original image PA so that the first luminance value BA1 of the pixel of the original image PA becomes the maximum luminance value BX, and the third luminance value BA3 of the pixel of the original image PA becomes the minimum luminance value BN, and then generates each of the first image P1 through the eighth image P8, but the embodiment of the present disclosure is not limited thereto. It is possible for the luminance adjustment section 111 to generate each of the first image P1 through the eighth image P8 without adjusting the luminance values BA of the pixels of the original image PA. In this case, the processing can be simplified.

Further, although in the present embodiment, each of the first image P1 through the eighth image P8 is generated based on the original image PA, the embodiment of the present disclosure is not limited thereto. It is sufficient to generate at least the first image P1 and the second image P2 based on the original image PA. It is also possible to generate, for example, each of the first image P1 through the fourth image P4 based on the original image PA. Further, it is possible to generate each of the first image P1, the second image P2, the fifth image P5, and the sixth image P6 based on the original image PA.

Further, although in the present embodiment, the generation section 131 converts the luminance value B into the transmittance T so that the higher the luminance value B is, the higher the transmittance T is, the embodiment of the present disclosure is not limited thereto. It is sufficient for the generation section 131 to convert the luminance value B into the transmittance T. It is possible for the generation section 131 to convert the luminance value B into the transmittance T so that, for example, the higher the luminance value B is, the lower the transmittance T is.

Further, each of the functional sections shown in FIG. 1 and FIG. 2 represents the functional configuration, and the specific implementation configuration is not particularly limited. In other words, it is not necessarily required to install the hardware individually corresponding to each of the functional sections, but it is obviously possible to adopt a configuration of realizing the functions of the plurality of functional sections by a single processor executing a program. Further, a part of the function realized by software in the embodiment described above can also be realized by hardware, or a part of the function realized by hardware can also be realized by software. Besides the above, the specific detailed configuration of each of other sections of the projector 1 can arbitrarily be modified within the scope or the spirit.

Further, the processing units of the flowcharts shown in FIG. 11 and FIG. 12 are obtained by dividing the process of the projector 200 in accordance with major processing contents in order to make the process of the projector 1 easy to understand. The way of division or the names of the processing units shown in the flowchart in FIG. 11 and FIG. 12 are not a limitation, and it is also possible to divide the processing into a larger number of processing units, or it is also possible to divide the processing so that one processing unit includes a larger amount of processing in accordance with the processing contents. Further, the processing sequence of the flowchart described above is not limited to the illustrated example.

Further, the method of controlling the projector 1 can be realized by making the processor 10A provided to the projector 1 execute the program corresponding to the method of controlling the projector 1. Further, it is also possible to record the program on a recording medium storing the program in a computer readable manner. As the recording medium, there can be used a magnetic or optical recording medium, or a semiconductor memory device. Specifically, there can be cited a portable or rigid recording medium such as a flexible disk, an HDD (Hard Disk Drive), a CD-ROM (Compact Disc Read Only Memory), a DVD (Digital Versatile Disc), a Blu-ray (registered trademark) disc, a magnetooptic disc, a flash memory, or a card-type recording medium. Further, the recording medium can also be a RAM (Random Access Memory) as an internal storage device provided to the image processing device, or a non-volatile storage device such as a ROM (Read Only Memory) or the HDD. Further, it is also possible to realize the method of controlling the projector 1 by storing the program corresponding to the method of controlling the projector 1 in a server device or the like in advance, and then downloading the program from the server device to the projector 1.

What is claimed is:

1. A method of controlling a display device, comprising:
   a distributing step of distributing each of luminance values of a plurality of pixels constituting an original image into a first luminance value, a second luminance value lower than the first luminance value, and a third luminance value lower than the second luminance value;
   a first replacing step of replacing the luminance values of the pixels corresponding to the second luminance value with the third luminance value in the original image to generate a first image;
   a second replacing step of replacing the luminance values of the pixels corresponding to the second luminance value with the first luminance value in the original image to generate a second image; and
   a generating step of converting the luminance values of the pixels into transmittances in each of the first image and the second image to generate mask images.

2. The method of controlling a display device according to claim 1, further comprising:
   a third replacing step of replacing the luminance values of the pixels corresponding to the second luminance value with the third luminance value, and replacing the luminance values of the pixels corresponding to the third luminance value with the second luminance value in the original image to generate a third image; and
   a fourth replacing step of replacing the luminance values of the pixels corresponding to the second luminance value with the first luminance value, and replacing the luminance values of the pixels corresponding to the first luminance value with the second luminance value in the original image to generate a fourth image, wherein
   in the generating step, the luminance values of the pixels are converted into transmittances in each of the third image and the fourth image to generate mask images.

3. The method of controlling a display device according to claim 2, further comprising:

a seventh replacing step of replacing the luminance values of the pixels corresponding to the third luminance value with the first luminance value, and replacing the luminance values of the pixels corresponding to the first luminance value with the third luminance value in the third image to generate a seventh image; and an eighth replacing step of replacing the luminance values of the pixels corresponding to the third luminance value with the first luminance value, and replacing the luminance values of the pixels corresponding to the first luminance value with the third luminance value in the fourth image to generate an eighth image, wherein in the generating step, the luminance values of the pixels are converted into transmittances in each of the seventh image and the eighth image to generate mask images.

4. The method of controlling a display device according to claim 1, further comprising:

a fifth replacing step of replacing the luminance values of the pixels corresponding to the third luminance value with the first luminance value, and replacing the luminance values of the pixels corresponding to the first luminance value with the third luminance value in the first image to generate a fifth image; and a sixth replacing step of replacing the luminance values of the pixels corresponding to the third luminance value with the first luminance value, and replacing the luminance values of the pixels corresponding to the first luminance value with the third luminance value in the second image to generate a sixth image, wherein in the generating step, the luminance values of the pixels are converted into transmittances in each of the fifth image and the sixth image to generate mask images.

5. The method of controlling a display device according to claim 1, wherein the first luminance value represents a maximum luminance value, and the third luminance value represents a minimum luminance value.

6. The method of controlling a display device according to claim 1, further comprising:

a determining step of determining whether or not the luminance values of the pixels constituting an outer edge of the original image are the second luminance value, wherein when it was determined in the determining step that the luminance values of the pixels constituting the outer edge of the original image were not the second luminance value, the luminance values of the pixels are converted, in the generating step, into the transmittances in the original image to generate the mask image.

7. A display device comprising:

a distribution section configured to distribute each of luminance values of a plurality of pixels constituting an original image into a first luminance value, a second luminance value lower than the first luminance value, and a third luminance value lower than the second luminance value;

a first replacement section configured to replace the luminance values of the pixels corresponding to the second luminance value with the third luminance value in the original image to generate a first image;

a second replacement section configured to replace the luminance values of the pixels corresponding to the second luminance value with the first luminance value in the original image to generate a second image; and a generation section configured to convert the luminance values of the pixels into transmittances in each of the first image and the second image to generate mask images.

* * * * *